United States Patent
Morioka et al.

(10) Patent No.: US 10,756,388 B2
(45) Date of Patent: Aug. 25, 2020

(54) SOLID ELECTROLYTE AND BATTERY

(71) Applicants: LINTEC CORPORATION, Tokyo (JP); NATIONAL UNIVERSITY CORPORATION TOKYO UNIVERSITY OF AGRICULTURE AND TECHNOLOGY, Tokyo (JP)

(72) Inventors: Takashi Morioka, Tokyo (JP); Yoichi Tominaga, Tokyo (JP); Koji Nakano, Tokyo (JP)

(73) Assignees: LINTEC CORPORATION, Tokyo (JP); NATIONAL UNIVERSITY CORPORATION TOKYO UNIVERSITY OF AGRICULTURE AND TECHNOLOGY, Tokyo (JP)

(*) Notice: Subject to any disclaimer, the term of this patent is extended or adjusted under 35 U.S.C. 154(b) by 0 days.

(21) Appl. No.: 15/753,701

(22) PCT Filed: Aug. 17, 2016

(86) PCT No.: PCT/JP2016/073966
§ 371 (c)(1),
(2) Date: Feb. 20, 2018

(87) PCT Pub. No.: WO2017/033805
PCT Pub. Date: Mar. 2, 2017

(65) Prior Publication Data
US 2018/0219255 A1    Aug. 2, 2018

(30) Foreign Application Priority Data

Aug. 21, 2015  (JP) .................................. 2015-163579

(51) Int. Cl.
*H01M 10/0565*    (2010.01)
*C08G 64/34*    (2006.01)
(Continued)

(52) U.S. Cl.
CPC ........ *H01M 10/0565* (2013.01); *C08G 64/34* (2013.01); *C08K 5/435* (2013.01);
(Continued)

(58) Field of Classification Search
None
See application file for complete search history.

(56) References Cited

U.S. PATENT DOCUMENTS

| | | | |
|---|---|---|---|
| 6,482,545 B1 | 11/2002 | Skotheim et al. | |
| 7,088,572 B2 | 8/2006 | Yoshida et al. | |
| 2008/0038642 A1* | 2/2008 | Kwak | H01M 10/0525 429/309 |

FOREIGN PATENT DOCUMENTS

| | | |
|---|---|---|
| CN | 1210613 A | 3/1999 |
| CN | 1267683 A | 9/2000 |

(Continued)

OTHER PUBLICATIONS

Inoue et al ("Copolymerization of Carbon Dioxide and Epoxide", Polymer Letters, vol. 7, p. 287-292 (1969)). (Year: 1969).*

(Continued)

*Primary Examiner* — Amanda C. Walke
(74) *Attorney, Agent, or Firm* — McDermott Will & Emery LLP

(57) ABSTRACT

A solid electrolyte contains: a copolymer having a constituent unit represented by a formula (1) below and a constituent unit represented by a formula (2) below; and a metal salt.

(1)

(Continued)

In the formula (1), m is 2 or 3, and $R^1$ each independently represent a hydrogen atom or a methyl group.

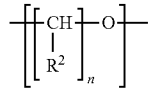

(2)

In the formula (2), n is 2 or 3, and $R^2$ each independently represent a hydrogen atom or a methyl group.

7 Claims, 24 Drawing Sheets

(51) Int. Cl.
    *H01M 10/052*     (2010.01)
    *C08K 5/435*     (2006.01)
    *H01B 1/12*     (2006.01)
    *C08L 69/00*     (2006.01)
    *H01M 10/0525*     (2010.01)

(52) U.S. Cl.
    CPC ............... *C08L 69/00* (2013.01); *H01B 1/12* (2013.01); *H01M 10/052* (2013.01); *H01M 10/0525* (2013.01); *C08L 2203/20* (2013.01); *H01M 2300/0082* (2013.01)

(56) References Cited

FOREIGN PATENT DOCUMENTS

| | | |
|---|---|---|
| CN | 1338130 A | 2/2002 |
| CN | 1341675 A | 3/2002 |
| CN | 1372704 A | 10/2002 |
| CN | 1384125 A | 12/2002 |
| JP | H08-217869 A | 8/1996 |
| JP | 2000-351843 A | 12/2000 |
| JP | 2009-104891 A | 5/2009 |
| JP | 2010-287563 A | 12/2010 |
| JP | 2011-216443 A | 10/2011 |
| JP | 2013-155213 A | 8/2013 |
| JP | 2015-173017 A | 10/2015 |
| JP | 2016-126928 A | 7/2016 |

OTHER PUBLICATIONS

Machine-assisted English translation for JP 2013-155213. (Year: 2013).*
Japanese Office Action issued in corresponding Japanese Patent Application No. 2017-536767, dated Aug. 7, 2018, with English Translation.
English translation of International Preliminary Report on Patentability, which issued in corresponding International Patent Application No. PCT/JP2016/073966, dated Feb. 27, 2018.
P. Wright, "Electrical conductivity in Ionic Complexes of Poly(ethylene oxide)a," British Polymer Journal, vol. 7, (1975), pp. 319-327.
International Search Report issued in Application No. PCT/JP2016/073966 dated Nov. 15, 2016, with English translation.
Database WPI, Week 201355, Thomson Scientific, London, GB; An 2013-M27221, XP002788614.
Extended European Search Report issued in corresponding European Patent Application No. 16839152.2, dated Feb. 20, 2019.
Hans-Georg Elias: "Makromolekule, Band 1: Chemische Struktur and Synthesen", Dec. 31, 1999, Wiley VCH, XP055340824, ISBN: 978-3-527-29959-1, pp. 75-77, DOI 10.1002/9783527626557.ch3.
Office Action issued in corresponding European Patent Application No. 16839152.2, dated Jun. 6, 2019.
Chinese Office Action issued in corresponding Chinese Patent Application No. 201680048306.1, dated Oct. 12, 2019, with English translation.
Taiwanese Office Action issued in corresponding Taiwan Patent Application No. 105126238, dated Nov. 13, 2019, with English transation.
Hans-George Elias: "Makromolekule, Band 1: Chemische Struktur and Synthesen", Dec. 31, 1999, Wiley VCH, XP055340824, ISBN: 978-3-527-29959-1, pp. 75-77, DOI 10.1002/9783527626557.ch3.

* cited by examiner

SOLID ELECTROLYTE AND BATTERY

RELATED APPLICATIONS

This application is the U.S. National Phase under 35 U.S.C. § 371 of International Application No. PCT/JP2016/073966, filed on Aug. 17, 2016, which in turn claims the benefit of Japanese Application No. 2015-163579, filed on Aug. 21, 2015, the disclosures of which are incorporated in their entirety by reference herein.

TECHNICAL FIELD

The invention relates to a solid electrolyte and a battery.

BACKGROUND ART

A solid electrolyte, which entails no possibility of liquid leakage unlike a liquid electrolyte, is in the form of a lightweight and flexible electrolyte film. The solid electrolyte is thus expected to be used in, for instance, a secondary battery using lithium ion or the like. A polyether, such as polyethylene oxide (PEO), electrolyte has been frequently studied as a typical solid electrolyte. For instance, Non-patent Literature 1 discloses an ionics material of polyethylene oxide (PEO)-metal salt complex.

Further, the study of a polycarbonate electrolyte has recently been progressed. For instance, Patent Literature 1 discloses a solid polymer electrolyte that contains: an organic polymer having a polyalkylene carbonate unit in a main chain; and a metal salt. Patent Literature 2 discloses a solid polymer electrolyte that contains: an aliphatic polycarbonate having a side chain where a substituent is bonded through an ether bond; and an electrolytic salt compound.

CITATION LIST

Patent Literature(S)

Patent Literature 1 JP 08-217869 A
Patent Literature 2 JP 2010-287563 A

NON-PATENT LITERATURE(S)

Non-patent Literature 1 Wright, "British Polymer Journal", Great Britain, 1975, Vol. 7, page 319

SUMMARY OF THE INVENTION

Problem(s) to be Solved by the Invention

Unfortunately, a polyether electrolyte as disclosed in Non-patent Literature 1, which is highly flexible and an excellent electrolyte material, forms a strong solvation structure with cations. The polyether electrolyte thus disadvantageously has a low cation transport number. It should be noted that the cation transport number means a ratio of the ion conductivity of the cations to the total ion conductivity. In contrast, a polycarbonate electrolyte as disclosed in Patent Literature 1 has a high cation transport number but a low polymer flexibility as compared with a polyether electrolyte. The polycarbonate electrolyte thus disadvantageously has a low ion conductivity.

Since the ion conductivity and the cation transport number are in a trade-off relationship as described above, none of typical solid electrolytes possesses both a high ion conductivity and a high cation transport number.

The solid polymer electrolyte of Patent Literature 2 contains an aliphatic polycarbonate having a side chain where a substituent is bonded through an ether bond. Such a structure is intended to improve the ion conductivity, which is the disadvantage of the aliphatic polycarbonate. However, the solid polymer electrolyte of Patent Literature 2 is not sufficient in terms of ion conductivity.

An object of the invention is to provide a solid electrolyte and a battery with a high ion conductivity and a high cation transport number.

Means for Solving the Problem(s)

According to an aspect of the invention, a solid electrolyte contains: a copolymer having a constituent unit represented by a formula (1) below and a constituent unit represented by a formula (2) below; and a metal salt.

Formula 1

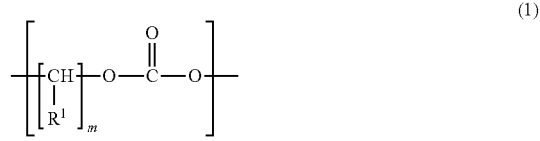

(1)

In the formula (1), m is 2 or 3, $R^1$ each independently represent a hydrogen atom or a methyl group.

Formula 2

(2)

In the formula (2), n is 2 or 3, and $R^2$ each independently represent a hydrogen atom or a methyl group.

In the above aspect, it is preferable that m in the formula (1) is 2 and n in the formula (2) is 2.

In the above aspect, it is preferable that $R^1$ in the formula (1) each represent a hydrogen atom and $R^2$ in the formula (2) each represent a hydrogen atom.

In the above aspect, it is preferable that when a mole number of the constituent unit represented by the formula (1) in the copolymer is x (mol) and a mole number of the constituent unit represented by the formula (2) in the copolymer is y (mol), a condition represented by an equation (F1) below is satisfied, $$0.01 \le [x/(x+y)] \le 0.99 \tag{F1}$$

In the above aspect, it is preferable that the metal salt is a lithium salt.

In the above aspect, it is preferable that the lithium salt contains at least one of lithium-bis(trifluoromethanesulfonyl)imide or lithium-bis(fluorosulfonyl)imide.

In the above aspect, it is preferable that when a mole number of the constituent unit represented by the formula (1) in the copolymer is x (mol), a mole number of the constituent unit represented by the formula (2) in the copolymer is y (mol), and a mole number of a metal in the metal salt is z (mol), a condition represented by an expression (F2) below is satisfied, $$0.01 \le [z/(x+y)] \le 2 \tag{F2}$$

According to another aspect of the invention, a battery includes the solid electrolyte according to the above aspect.

The above aspects of the invention can provide a solid electrolyte and a battery with a high ion conductivity and a high cation transport number.

BRIEF DESCRIPTION OF DRAWING(S)

DESCRIPTION OF EMBODIMENT(S)

Solid Electrolyte

Figure 1:
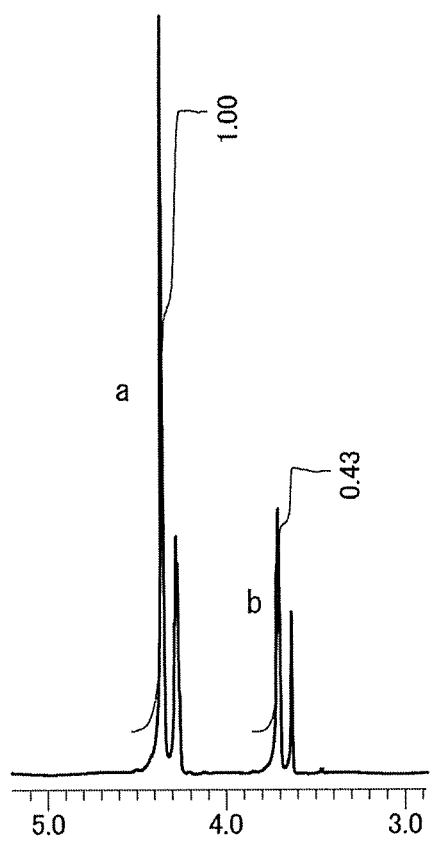
FIG. 1 shows a $^1$H-NMR spectrum of a copolymer A synthesized in Example 1.

The invention will be described with reference to an exemplary embodiment(s).

The invention is not limited to the contents of the exemplary embodiment.

A solid electrolyte of the exemplary embodiment contains a later-described copolymer and a later-described metal salt. The use of the later-described copolymer allows the solid electrolyte of the exemplary embodiment to possess both a high ion conductivity and a high cation transport number. First, the copolymer of the exemplary embodiment will be described.

Copolymer

The copolymer of the exemplary embodiment contains a constituent unit (hereinafter occasionally referred to as carbonate unit) represented by a formula (1) below and a constituent unit (hereinafter occasionally referred to as ether unit) represented by a formula (2) below.

Formula 3

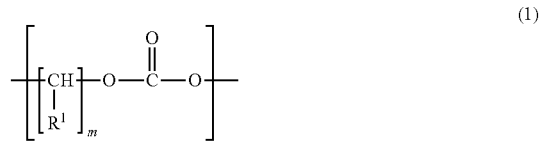

(1)

Formula 4

(2)

In the formula (1), m is 2 or 3, $R^1$ each independently represent a hydrogen atom or a methyl group. The plural $R^1$ may be mutually the same or different.

In the exemplary embodiment, m is preferably 2 in terms of synthesizability and an improvement in ion conductivity. Further, $R^1$ each preferably represent a hydrogen atom in terms of synthesizability and an improvement in ion conductivity. Specifically, a constituent unit represented by a formula (3) below is especially preferable.

Formula 5

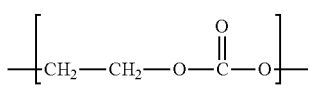
(3)

In the formula (2), n is 2 or 3, $R^2$ each independently represent a hydrogen atom or a methyl group. The plural $R^2$ may be mutually the same or different.

In the exemplary embodiment, n is preferably 2 in terms of synthesizability and an improvement in ion conductivity. Further, $R^2$ each preferably represent a hydrogen atom in terms of synthesizability and an improvement in ion conductivity. Specifically, a constituent unit represented by a formula (4) below is especially preferable.

Formula 6

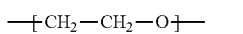
(4)

The copolymer of the exemplary embodiment preferably satisfies a condition represented by an expression (F1) below when the mole number of the constituent unit represented by the formula (1) in the copolymer is x (mol) and the mole number of the constituent unit represented by the formula (2) in the copolymer is y (mol).

$$0.01 \leq [x/(x+y)] \leq 0.99 \quad (F1)$$

When the value of [x/(x+y)] is equal to or more than the above lower limit, the ether unit in the copolymer is prevented from forming a strong solvation structure with cations, increasing the cation transport number of the solid electrolyte. Further, so-called backbiting, which is a decomposition reaction unique to a polymer having a carbonate unit (i.e., formation of cyclic carbonate by depolymerization), can be prevented to improve the heat resistance of the copolymer. Further, when the value of [x/(x+y)] is equal to or less than the above upper value, the glass transition temperature of the copolymer can be lowered to improve the ion conductivity of the solid electrolyte.

The value of [x/(x+y)] more preferably ranges from 0.03 to 0.97 in terms of the above, further preferably from 0.05 to 0.95, especially preferably from 0.1 to 0.9.

It should be noted that [x/(x+y)] represents the molar ratio of the carbonate unit in the copolymer.

When expressed as a weight average molecular weight (Mw), the molecular weight of the copolymer of the exemplary embodiment preferably ranges from 5,000 to 5,000,000 in terms of standard polystyrene measured by a gel permeation chromatography (GPC) method, more preferably from 10,000 to 1,000,000.

When expressed as a number average molecular weight (Mn), the molecular weight preferably ranges from 3,000 to 3,000,000, more preferably from 5,000 to 500,000.

Further, a ratio (Mw/Mn) of the weight average molecular weight (Mw) to the number average molecular weight (Mn) preferably ranges from 1 to 10, more preferably from 1.1 to 5.

The copolymer of the exemplary embodiment may be a random copolymer or a block copolymer, but is preferably a random copolymer in terms of synthesizability.

The copolymer of the exemplary embodiment, which is preferably a copolymer having both a carbonate unit and an ether unit, may also have a repeating unit of another structure.

The content of the copolymer in the solid electrolyte preferably ranges from 5 mass % to 99 mass % for 100 mass % of the solid electrolyte, more preferably from 10 mass % to 95 mass %.

Manufacturing Method of Copolymer

A manufacturing method of the copolymer according to the exemplary embodiment is not limited. The copolymer of the exemplary embodiment may be manufactured by, for instance, copolymerizing an epoxide monomer (e.g., ethylene oxide) and carbon dioxide in the presence of a polymerization catalyst as in later-described Example(s). Specifically, ethylene oxide, which forms a constituent unit represented by the formula (4) through a ring-opening reaction, is partly polymerized with carbon dioxide during a ring-opening reaction to form a constituent unit represented by the formula (3).

The polymerization catalyst used for manufacturing the copolymer of the exemplary embodiment is not limited, but may be a metal salen complex catalyst (e.g., cobalt salen complex catalyst) or an organic zinc catalyst.

The usage of the polymerization catalyst for the copolymerization reaction between the epoxide monomer and carbon dioxide is preferably 0.05 mol or less for 1 mol of the epoxide monomer, more preferably 0.01 mol or less, especially preferably 0.001 mol or less. When, for instance, the organic zinc catalyst is used, the usage thereof is preferably 0.2 mol or less for 1 mol of the epoxide monomer, more preferably 0.1 mol or less, especially preferably 0.05 mol or less.

Further, when the metal salen complex catalyst is used, a promoter may be used. The promoter is preferably, for instance, an onium salt compound. Specific examples of the onium salt compound preferably include, but not limited to, bis(triphenylphosphoranylidene)ammonium chloride (PPNCl), piperidine, bis(triphenylphosphoranylidene)ammonium fluoride (PPNF), ammonium pentafluorobenzoate (PPNOBzF$_5$), and tetra-n-butyl ammonium chloride (nBu$_4$NCl) in terms of a high reaction activity.

It should be noted that optimum conditions for polymerization, which depend on the type of catalyst, may require that a pressure of carbon dioxide in the reaction container ranges from 0.1 MPa to 10 MPa, preferably from 0.5 MPa to 7.0 MPa.

Further, for, for instance, the cobalt salen complex catalyst, a polymerization temperature is preferably approximately set at room temperature (25 degrees C.) to achieve a favorable catalysis and accelerate a reaction speed. In contrast, for, for instance, the organic zinc catalyst, the polymerization temperature ranges from 40 degrees C. to 100 degrees C., preferably approximately from 60 degrees C. to 80 degrees C.

For the method of copolymerizing the epoxide monomer with carbon dioxide, the epoxide monomer used as a starting material may be, for instance, ethylene oxide or propylene oxide.

For such a manufacturing method of the copolymer, for instance, [x/(x+y)] and the weight average molecular weight (Mw) of the copolymer of the exemplary embodiment may be adjusted as follows.

The value of [x/(x+y)] can be adjusted by changing, for instance, the type of polymerization catalyst, polymerization catalyst amount, polymerization temperature, polymerization time, and/or CO$_2$ pressure. For instance, a reduction in the polymerization temperature can increase the carbonate unit (x). An increase in the $CO_2$ pressure can also increase the carbonate unit (x).

The molecular weight can be adjusted on the basis of, for instance, the catalyst amount and the polymerization time. For instance, a reduction in the catalyst amount can increase the molecular weight. An increase in the polymerization time can also increase the molecular weight.

Metal Salt

The metal salt of the exemplary embodiment is not limited, but at least one of alkali metal salt may be used as the metal salt. Examples of the alkali metal salt include lithium salt, sodium salt, and potassium salt.

In the exemplary embodiment, the metal salt is preferably lithium salt. The metal salt can be present as cations from, for instance, alkali metal and counter ions of the cations in the solid electrolyte. When the metal salt is lithium salt, the energy density further increases.

Examples of the lithium salt include $LiClO_4$, $LiBF_4$, $LiI$, $LiPF_6$, $LiCF_3SO_3$, $LiCF_3COO$, $LiNO_3$, $LiAsF_6$, $LiSbF_6$, $LiAlCl_4$, $LiCl$, $LiBr$, $LiB(C_2H_5)_4$, $LiCH_3SO_3$, $LiC_4F_9SO_3$, $Li(CF_3SO_2)_2N$, $Li(C_2F_5SO_2)_2N$, and $Li(FSO_2)_2N$. Among the above, the lithium salt preferably contains at least one of $Li(CF_3SO_2)_2N$(lithium-bis(trifluoromethanesulfonyl)imide: LiTFSI) or $Li(FSO_2)_2N$(lithium-bis(fluorosulfonyl)imide: LiFSI) in terms of ion conductivity. Plural kinds of metal salt may be contained in the solid electrolyte.

The solid electrolyte of the exemplary embodiment preferably satisfies a condition represented by an expression (F2) below when the mole number of the constituent unit represented by the formula (1) in the copolymer is x (mol), the mole number of the constituent unit represented by the formula (2) in the copolymer is y (mol), and the mole number of metal in the metal salt is z (mol).

$$0.01 \leq [z/(x+y)] \leq 2 \tag{F2}$$

Further, the value of [z/(x+y)] more preferably ranges from 0.05 to 1.8 in terms of an improvement in the ion conductivity, further preferably from 0.1 to 1.6. It should be noted that a sufficient ion conductivity can be achieved at a value of [z/(x+y)] equal to or more than the above lower limit. At a value of [z/(x+y)] equal to or less then the above upper limit, the salt can be sufficiently dissolved in the solid electrolyte, preventing precipitation of the salt and, consequently, preventing a reduction in the ion conductivity. Further, at a value of [z/(x+y)] equal to or less than the above upper limit, the ratio of the polymer in the solid electrolyte is prevented from excessively dropping, thus allowing the solid electrolyte to be kept in a solid state.

It should be noted that [z/(x+y)] represents a molar ratio of the metal (i.e., a metal derived from the metal salt, including a metal undissociated from the metal salt as well as a metal ion dissociated from the metal salt) to the total of the carbonate unit and the ether unit in the solid electrolyte. Further, [z/(x+y)]×100 (unit: mol %) is occasionally referred to as the salt concentration of the solid electrolyte.

The solid electrolyte of the exemplary embodiment may contain other components in addition to the copolymer and the metal salt of the exemplary embodiment as long as an object of the invention is achievable.

For instance, the solid electrolyte of the exemplary embodiment may be an electrolyte in a solid state containing no solvent (a solvent-free solid electrolyte) or be a gel electrolyte containing a solvent (a polymer gel electrolyte). When the solid electrolyte is a polymer gel electrolyte, the content of the solvent in the polymer gel electrolyte usually ranges from 30 mass % to 99 mass % of the entirety of the solid electrolyte.

Further, the solid electrolyte of the exemplary embodiment may contain, for instance, known resins usable in an electrolyte, such as polyethylene oxide resins (PEO resins), polyacrylonitrile resins (acrylonitrile resins), polyvinylidene fluoride resins (fluorine resins), polymethyl methacrylate resins (acryl resins), and aliphatic polycarbonate resins.

Further, the solid electrolyte of the exemplary embodiment may contain a filler and/or any other additive. When the solid electrolyte contains a filler and/or any other additive, the contents thereof are each preferably equal to or less than 5 mass %.

Examples of the filler include talc, kaoline, clay, calcium silicate, alumina, zirconia, zinc oxide, antimony oxide, indium oxide, tin oxide, titanium oxide, iron oxide, magnesium oxide, aluminum hydroxide, magnesium hydroxide, silica, calcium carbonate, potassium titanate, barium titanate, mica, montmorillonite, and glass fiber. Among the above, at least one of alumina, zirconia, magnesium oxide, or barium titanate is preferably contained.

The method of manufacturing the solid electrolyte of the exemplary embodiment may include, but not limited to, polymerizing a monomer to yield a copolymer and subsequently adding a metal salt, or may alternatively include polymerizing a monomer in the presence of a metal salt to yield a copolymer. According to the former method, the solid electrolyte can be obtained by, for instance, dissolving a metal salt and a solvent in the copolymer of the exemplary embodiment and removing the solvent.

The shape, structure and the like of the solid electrolyte of the exemplary embodiment are not limited.

An example of the solid electrolyte of the exemplary embodiment is a solid electrolyte consisting of: a copolymer having a constituent unit represented by the formula (1) and a constituent unit represented by the formula (2); and a metal salt.

Another example of the solid electrolyte of the exemplary embodiment is a solid electrolyte containing: a copolymer having a constituent unit represented by the formula (3) and a constituent unit represented by the formula (4); and a metal salt, the copolymer having a value of [x/(x+y)] ranging from 0.1 to 0.8.

Still another example of the solid electrolyte of the exemplary embodiment is a solid electrolyte containing: a copolymer having a constituent unit represented by the formula (3) and a constituent unit represented by the formula (4); and a metal salt, the solid electrode having a value of [z/(x+y)] ranging from 0.05 to 1.6.

Yet another example of the solid electrolyte of the exemplary embodiment is a solid electrolyte containing: a copolymer having a constituent unit represented by the formula (3) and a constituent unit represented by the formula (4); and a metal salt, the copolymer having a value of [x/(x+y)] ranging from 0.1 to 0.8, the solid electrolyte having a value of [z/(x+y)] ranging from 0.05 to 1.6.

The solid electrolyte of the exemplary embodiment may be in the form of a solid electrolyte film. The solid electrolyte film preferably has self-supporting properties. Such a self-supporting solid electrolyte film is easily handleable. The self-supporting film means a film, or solid electrolyte film, peelable from a base and handleable while its shape is maintained.

The solid electrolyte film can be manufactured as follows. For instance, a solid electrolyte film can be manufactured by applying a mixed solution containing the copolymer, the metal salt and the solvent of the exemplary embodiment to a surface of the base to form a coating film, and removing the solvent from the coating film. With regard to the above, the surface of the base preferably has been subjected to a release treatment if the solid electrolyte film needs to be peeled from the base.

The solid electrolyte of the exemplary embodiment contains both the carbonate unit and the ether unit in a main chain of the copolymer. The carbonate unit in the copolymer serves to prevent the ether unit in the copolymer from forming a strong solvation structure with cations, improving the cation transport number of the solid electrolyte. It should be noted that a high cation transport number is preferable for the use of the electrolyte in a battery. Additionally, the ether unit in the copolymer serves to lower the glass transition temperature of the copolymer, improving the ion conductivity of the solid electrolyte.

Further, an ether unit at a terminal of the copolymer serves to prevent so-called backbiting, which is a decomposition reaction unique to a polymer having a carbonate unit (i.e., formation of cyclic carbonate by depolymerization), improving the heat resistance of the copolymer. It should be noted that the manufacturing method of the copolymer of the exemplary embodiment is likely to allow an ether unit to be at a terminal due to a difference in reactivity of the terminal group. The manufacturing method of the copolymer of the exemplary embodiment can thus provide a copolymer with a further improved heat resistance.

Further, the copolymer of the exemplary embodiment, which has a carbonate unit in a main chain, is easily synthesizable and thus can have an increased molecular weight.

Therefore, the copolymer of the exemplary embodiment can provide a self-supporting solid electrolyte film.

The solid electrolyte of the exemplary embodiment, which has a high ion conductivity and a high cation transport number, is suitably usable in, for instance, a battery. Examples of the battery including the solid electrolyte of the exemplary embodiment include a primary battery and a secondary battery.

Battery

A battery of the exemplary embodiment contains the solid electrolyte of the exemplary embodiment. According to the exemplary embodiment, an electrolyte layer in the battery is preferably made of a material containing the solid electrolyte of the exemplary embodiment. The battery includes an anode, a cathode, and the electrolyte layer interposed between the anode and the cathode. The above arrangement can provide a battery with excellent properties. The battery is preferably a secondary battery, more preferably a lithium ion secondary battery.

It should be noted that the solid electrolyte film may be directly formed on an electrode by applying a mixed solution containing the copolymer, the metal salt and the solvent to the electrode and removing the solvent. A variety of members in the lithium ion secondary battery of the exemplary embodiment are not limited, but may be made of a material(s) usable for a typical battery.

The solid electrolyte of the exemplary embodiment has an ion conductivity irrespective of whether it contains a solvent. Thus, the battery of the exemplary embodiment may be in the form of a battery that contains the solid electrolyte of the exemplary embodiment but not a solvent, allowing the safe use of the battery without any possibility of liquid leakage.

Incidentally, it should be understood that the scope of the invention is not limited to the above-described exemplary embodiment(s) but includes modifications and improvements compatible with the invention.

EXAMPLES

The exemplary embodiment of the invention will be described below in further detail with reference to Examples, but the invention is by no means limited to these Examples. It should be noted that measurement in Examples and Comparatives was performed as follows.

NMR Measurement

A structure of a sample polymer was determined by nuclear magnetic resonance spectroscopy ($^1$H-NMR, JEOL EX-400 manufactured by JEOL Ltd.). d-chloroform ($CDCl_3$, 0.03 mass % TMS) was used as a solvent.

Differential Thermal-Thermogravimetric Simultaneous Measurement (TG-DTA Measurement)

A 5%-weight-reduction temperature (a temperature at which a weight reduction, which is measured with a rise in the temperature of a measurement sample, reaches 5 weight %) was determined by a differential thermal analyzer (TG/DTA manufactured by Shimadzu Corporation, DTG-60). The temperature of the measurement sample was raised from 40 degrees C. to 500 degrees C. at a temperature-increase rate of 10 degrees C./min, and the 5%-weight-reduction temperature of the polymer was determined.

DSC Measurement

The glass transition temperature (Tg) of the polymer was determined using a differential scanning calorimeter (manufactured by TA instruments, model number: Q2000). The measurement sample was heated from −70 degrees C. to 100 degrees C. at a temperature-increase rate of 10 degrees C./min, and a change in heat quantity was determined to collect data.

Ion Conductivity Measurement

The obtained solid electrolyte film was cut into a 6-mm-diameter circle, which was sandwiched between electrodes in the form of two sheets of stainless steel, and an impedance between the stainless sheets was measured. The measurement was performed by an alternating current impedance method, where an alternating current (applied voltage: 10 mV) is applied between electrodes to measure a resistance component. The ion conductivity was calculated from a real impedance intercept in the thus obtained Cole-Cole plot. It should be noted that a potentiostat/galvanostat (SP-150, manufactured by Bio-Logic Science Instruments) was used for the measurement.

The ion conductivity (σ) was calculated by an expression (F3) below.

$$\sigma = L/(R \times S) \tag{F3}$$

In the expression (F3), σ represents an ion conductivity (unit: S·cm$^{-1}$), R represents a resistance (unit: Ω), S represents a sectional area of the solid electrolyte film at the time of measurement (unit: cm$^2$), and L represents an interelectrode distance (unit: cm).

The measurement temperature was set at each of 30 degrees C., 40 degrees C., 50 degrees C., 60 degrees C., 70 degrees C. and 80 degrees C. The ion conductivity (σ) was calculated from the measurement result of a complex impedance.

Measurement of Lithium Ion Transport Number (Li$^+$ Transport Number)

The obtained solid electrolyte film was cut into a 6-mm-diameter circle, which was sandwiched between electrodes in the form of two sheets of stainless steel to manufacture a cell. The cell was connected to a complex alternating impedance measuring device (Solartron 1280C). The measurement was started after the cell was left at 60 degrees C. for 24 hours or more. The complex impedance was first measured, and a voltage of 10 mV was applied to perform a direct-current polarization measurement after calculation of a resistance ($R_0$). An initial current value ($I_0$) and a steady current value ($I_S$) obtained when the current value became constant were determined. After determination of the steady current, a complex impedance measurement was again performed to calculate a resistance ($R_S$). A lithium ion transport number ($t_+$) was calculated by an expression (F4) below (Evans expression).

$$t_+ = I_s(\Delta V - I_0 \times R_0)/I_0(\Delta V - I_S \times R_S) \tag{F4}$$

In the expression (F4), $\Delta V$ represents the applied voltage, and $R_0$, $R_S$, $I_0$ and $I_S$ represent the same as above.

Example 1 (Example 1-1 to Example 1-8)

Synthesis of Polymerization Catalyst (R,R)—N,N'-bis(3,5-di-tert-butylsalicylidene)-1,2-diaminocyclohexanone cobalt(II) ("(R,R)-salcyCo$^{II}$", manufactured by Sigma-Aldrich Co., LLC.) and pentafluorobenzoic acid (manufactured by Tokyo Chemical Industry Co., Ltd.) were weighed with a balance to be at a molar ratio of 1:1.1, and put in a flask. Dehydrated toluene was then added to the flask. The flask was shaded with aluminum foil and left at room temperature for 20 hours for reaction. After completion of the reaction, a solvent was removed under reduced pressure and the reactant was washed with an excessive amount of hexane for several times. The reactant was then vacuum-dried at room temperature, thereby obtaining a cobalt salen complex. A synthesis scheme of the cobalt salen complex is shown below.

Formula 7

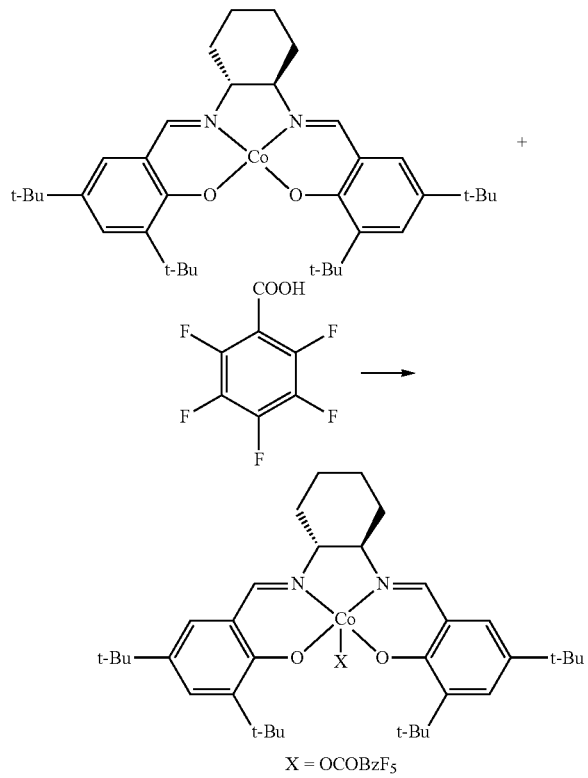

X = OCOBzF$_5$

Polymerization

Next, a copolymer A of Example was synthesized.

An ethylene oxide was used as an epoxide monomer. The obtained cobalt salen complex catalyst (polymerization catalyst) and a promoter, or bis(triphenylphosphoranylidene) ammonium chloride (PPNCl), were weighed with a balance to be at a molar ratio of monomer:catalyst:promoter=2000:1:1, and agitated in a pressure vessel. The pressure vessel was placed in argon atmosphere throughout the above process. Subsequently, after purging the inside of the pressure vessel with $CO_2$, $CO_2$ was introduced into the pressure vessel through a liquid delivery pump to set a pressure in the pressure vessel at 2.0 MPa. A polymerization reaction was then caused at 25 degrees C. for 20 hours. A synthesis scheme of the epoxide monomer and carbon dioxide is shown below.

Formula 8

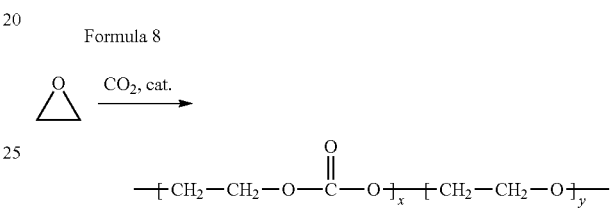

After completion of the reaction, the content in the pressure vessel was added with chloroform to prepare a chloroform solution, which was washed for several times by adding a 4M hydrochloric acid thereto. Subsequently, an organic layer was condensed using a rotary evaporator, and then a condensed solution was dropped into methanol subjected to agitation, thereby precipitating a product.

The product was then dried under reduced pressure in a desiccator using a diaphragm pump and, subsequently, vacuum-dried at 60 degrees C., thereby obtaining a copolymer A.

Figure 2:
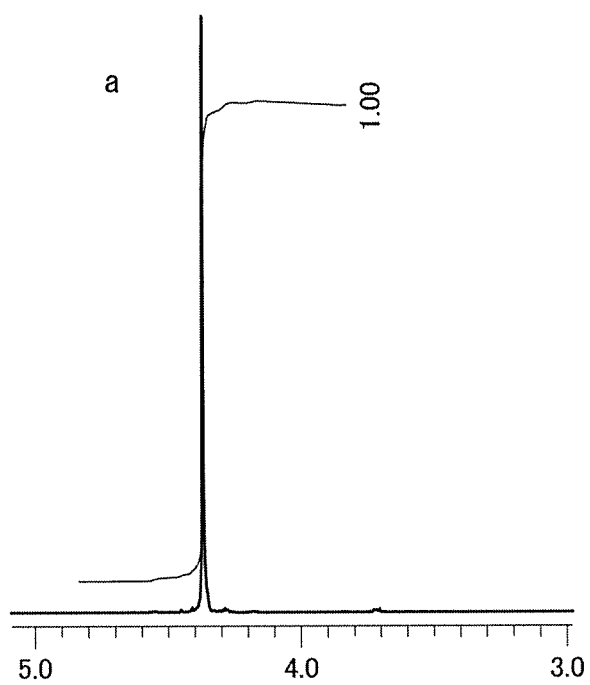
FIG. 2 shows a $^1$H-NMR spectrum of an aliphatic polycarbonate.
Figure 3:
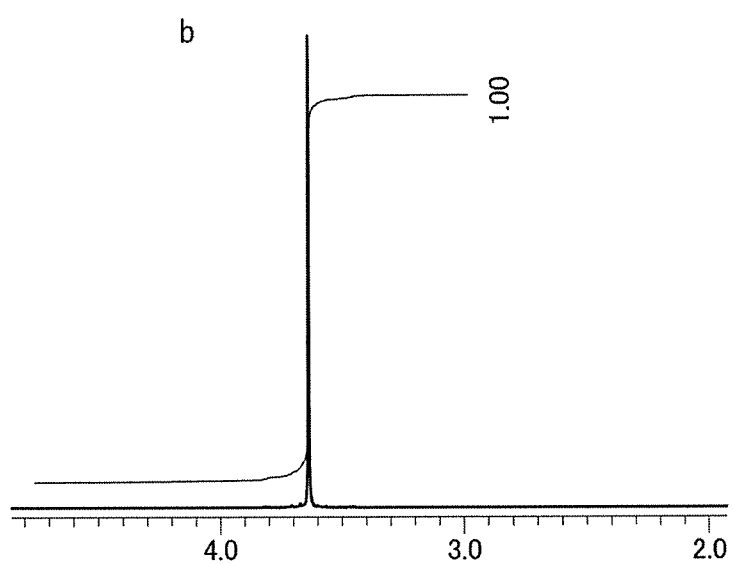
FIG. 3 shows a $^1$H-NMR spectrum of polyethylene oxide.
Figure 4:
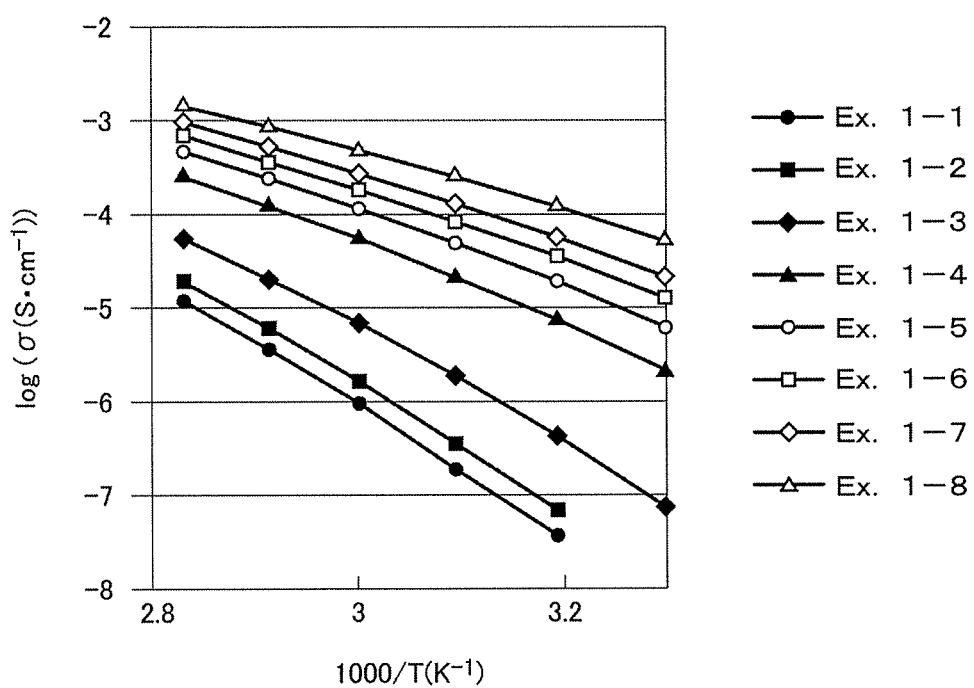
FIG. 4 shows an Arrhenius plot showing a relationship between a reciprocal number of temperature and a common logarithm of ion conductivity in each of Example 1-1 to Example 1-8.
Figure 5:
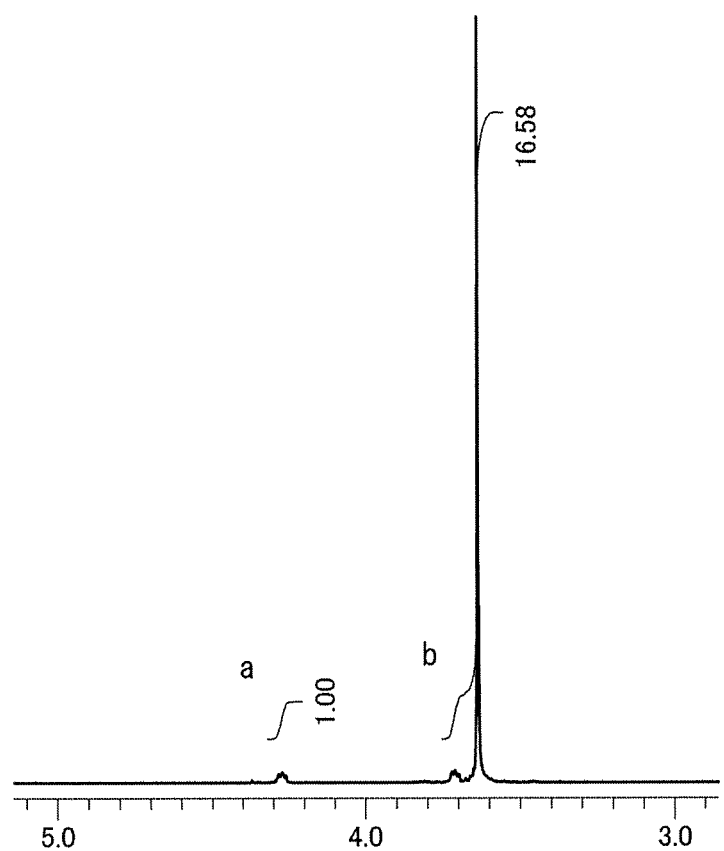
FIG. 5 shows a $^1$H-NMR spectrum of a copolymer B synthesized in Example 2.
Figure 6:
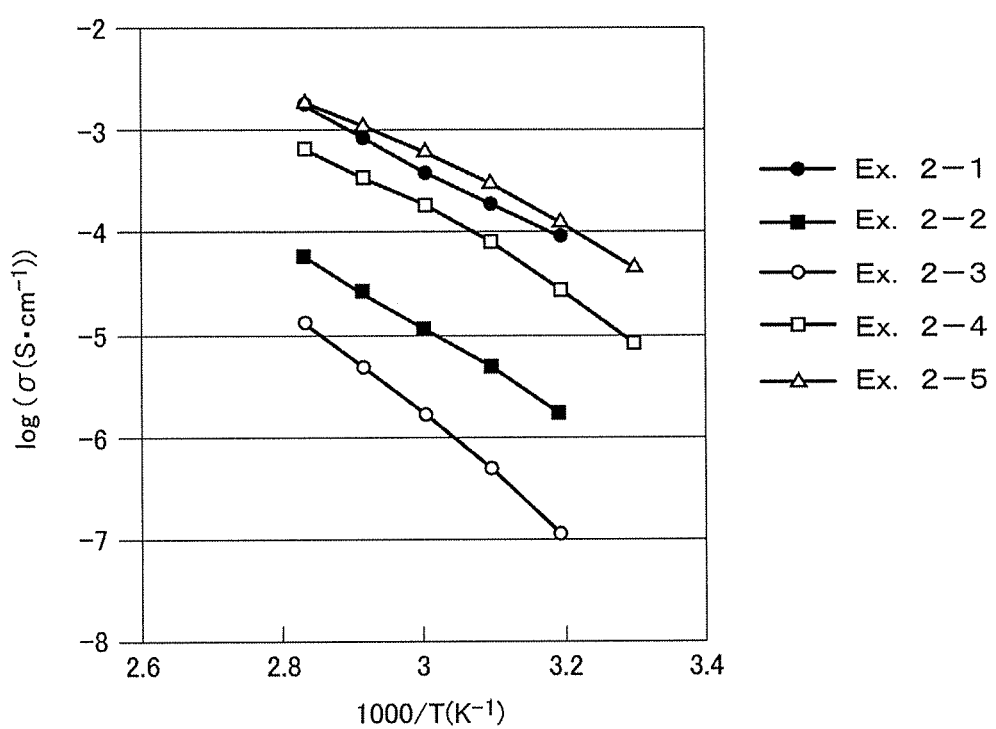
FIG. 6 shows an Arrhenius plot showing a relationship between a reciprocal number of temperature and a common logarithm of ion conductivity in each of Example 2-1 to Example 2-5.
Figure 7:
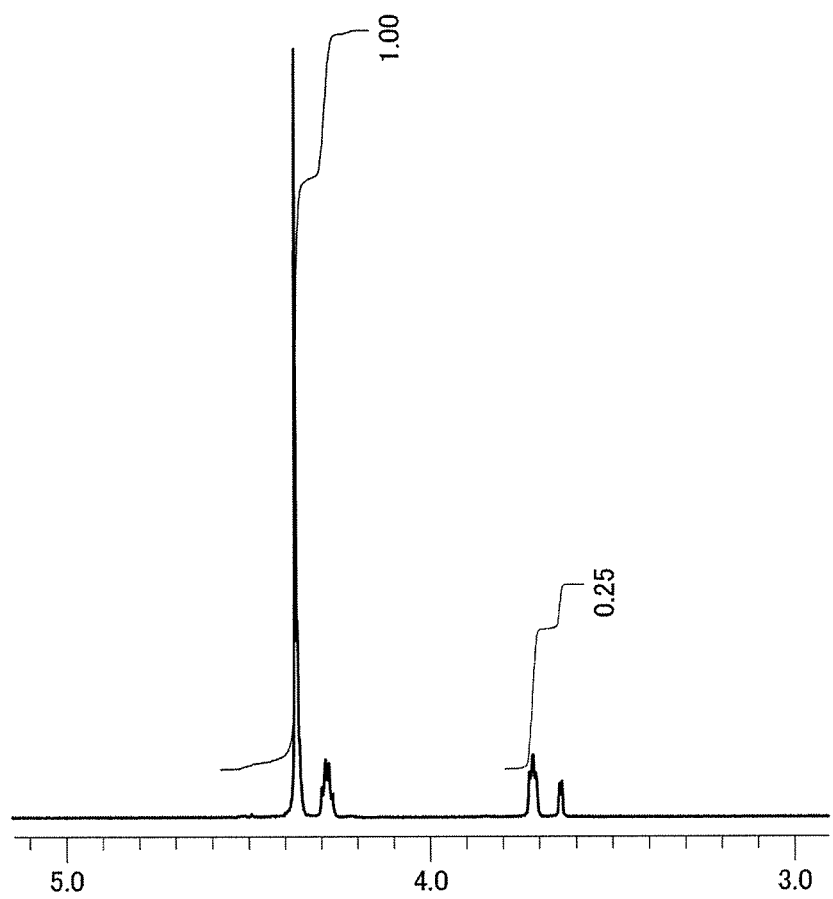
FIG. 7 shows a $^1$H-NMR spectrum of a copolymer C synthesized in Example 3.
Figure 8:
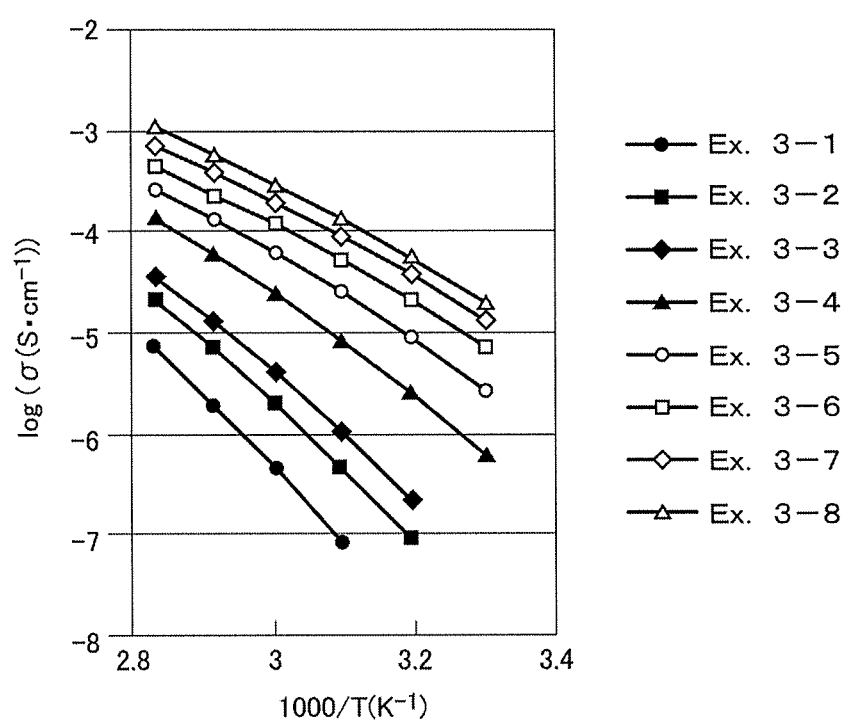
FIG. 8 shows an Arrhenius plot showing a relationship between a reciprocal number of temperature and a common logarithm of ion conductivity in each of Example 3-1 to Example 3-8.
Figure 9:
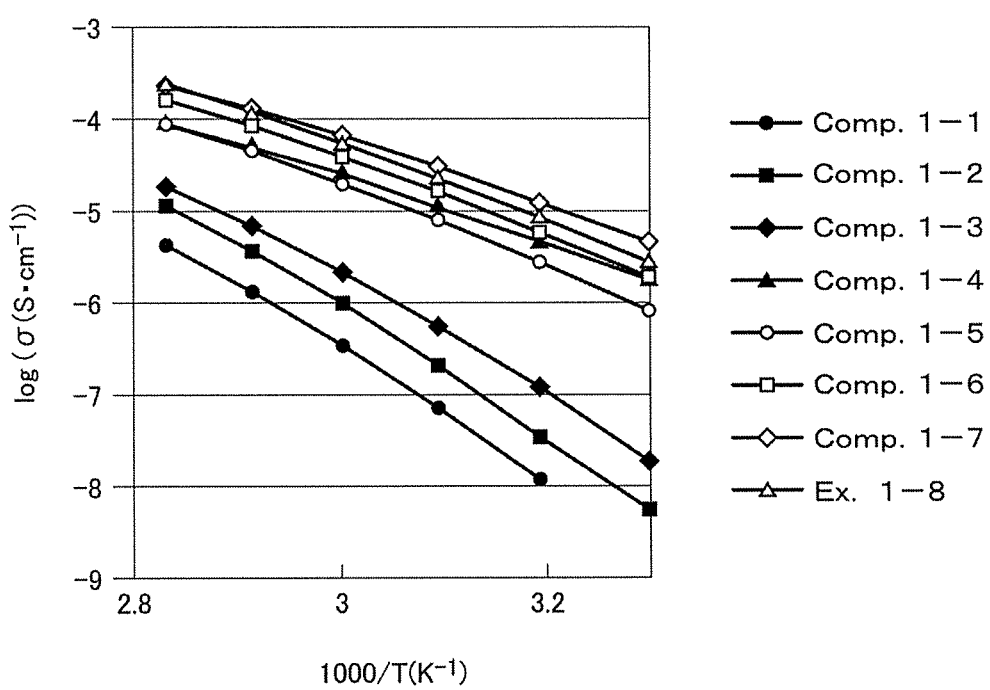
FIG. 9 shows an Arrhenius plot showing a relationship between a reciprocal number of temperature and a common logarithm of ion conductivity in each of Comparative 1-1 to Comparative 1-8.
Figure 10:
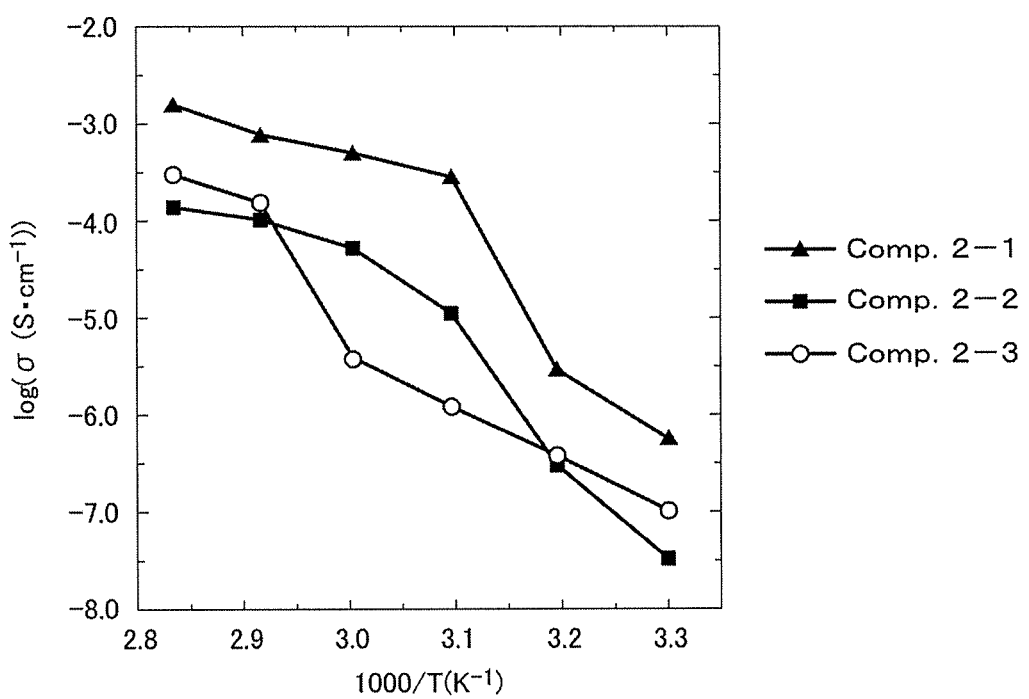
FIG. 10 shows an Arrhenius plot showing a relationship between a reciprocal number of temperature and a common logarithm of ion conductivity in each of Comparative 2-1 to Comparative 2-3.

A structure of the obtained copolymer A was determined using $^1$H-NMR (see FIGS. 1, 2 and 3). Specifically, in addition to the $^1$H-NMR measurement of the obtained copolymer A (FIG. 1), $^1$H-NMR measurement was performed on a commercially available polycarbonate (trade name: QPAC-25, manufactured by Empower Materials Inc.) (FIG. 2), and $^1$H-NMR measurement was performed on a commercially available polyethylene oxide (manufactured by Sigma-Aldrich Co., LLC.) (FIG. 3). With reference to the thus obtained measurement results, a ratio of a carbonate unit (a) and an ether unit (b) was estimated from an integral ratio of a methylene hydrogen corresponding to the carbonate unit (a) and a methylene hydrogen corresponding to the ether unit (b). A molar ratio ([x/(x+y)]) of the carbonate unit in the copolymer A was 0.7.

The copolymer A, the polycarbonate and the polyethylene oxide were further subjected to TG-DTA measurement and DSC measurement to determine the 5%-weight-reduction temperature and glass transition temperature of each of these substances. Table 1 shows the obtained results. With regard to the copolymer A, the polycarbonate and the polyethylene oxide, Table 1 also shows the molar ratio of the carbonate unit in the polymer, the number average molecular weight and Mw/Mn.

TABLE 1

| | Molar Ratio of Carbonate Unit in Polymer [x/(x + y)] | Number Average Molecular Weight Mn | Mw/Mn | 5%-Weight-Reduction Temperature (° C.) | Glass Transition Temperature (° C.) |
|---|---|---|---|---|---|
| Copolymer A | 0.7 | 139000 | 1.7 | 249 | 3 |
| Polycarbonate | 1.0 | 101000 | 2.3 | 205 | 10 |
| Polyethylene Oxide | 0.0 | 100000 | — | 295 | −55 |

As is understood from the results shown in Table 1, the copolymer A, which contains both the carbonate unit and the ether unit, has a higher 5%-weight-reduction temperature than the polycarbonate. This result has proven that the heat resistance of the copolymer can be improved by the ether unit contained therein. Further, the copolymer A has a lower glass transition temperature than the polycarbonate. In view of the above, the use of the copolymer A has been supposed to improve the ion conductivity of the solid electrolyte as compared with the use of the polycarbonate.

Manufacture of Solid Electrolyte Film

Next, a solid electrolyte film containing the solid electrolyte of Example was manufactured.

The obtained copolymer A was mixed with LiFSI having been weighed with a balance such that a salt concentration ($[z/(x+y)] \times 100$) in the solid electrolyte became as below, and well agitated to obtain a solid electrolyte. Subsequently, the solid electrolyte was casted on a fluorocarbon resin mold, and dried at 60 degrees C. for six hours in dry nitrogen atmosphere and further dried at 60 degrees C. for 24 hours under reduced pressure, thereby obtaining a solid electrolyte film having a salt concentration in the solid electrolyte as follows.

Example 1-1: 10 mol %
Example 1-2: 20 mol %
Example 1-3: 40 mol %
Example 1-4: 60 mol %
Example 1-5: 80 mol %
Example 1-6: 100 mol %
Example 1-7: 120 mol %
Example 1-8: 160 mol %

The ion conductivity ($\sigma$) of the obtained solid electrolyte film was measured. It should be noted that an Arrhenius plot was made to show the measurement results of the ion conductivity ($\sigma$), where the reciprocal of the measurement temperature (1000/T) was plotted on the abscissa and the common logarithm ($\log(\sigma)$) of the ion conductivity was plotted on the ordinate. Table 4 shows the results.

Example 2 (Example 2-1 to Example 2-5)

Synthesis of Polymerization Catalyst 1.33 g of tripotassium hexacyano cobaltate ($K_3[Co(CN)_6]$, manufactured by Wako Pure Chemical Industries, Ltd.) was dissolved in 20 mL of deionized water and dropped into an intensely agitated 50-degree-C $ZnCl_2$ solution (prepared by dissolving 11.42 g of $ZnCl_2$ in a mixed solution of 60 mL of deionized water and 30 mL of t-butyl alcohol) over a period of 45 minutes. The mixture was then intensely agitated for 60 minutes. The obtained white suspension was subjected to centrifugal separation at 5,000 rpm to isolate a white solid. The isolated white solid was intensely agitated in the solution of t-butyl alcohol and deionized water (volume ratio: t-butyl alcohol:deionized water=5:5) for 30 minutes to be resuspended. Subsequently, the amount of t-butyl alcohol was gradually increased with respect to water (the volume ratio of t-butyl alcohol:deionized water was changed from 6:4 to each of 7:3, 8:2 and 9:1), and isolation by centrifugal separation and resuspension were repeated for several times. Finally, the white solid was isolated by centrifugal separation after resuspended in the t-butyl alcohol. The mixture was then vacuum-dried at 50 degrees C. until the weight of the mixture became constant, thereby obtaining a DMC catalyst, $Zn_3(Co[CN]_6)_2$.

The obtained DMC catalyst, or a catalyst of Example 2, was weighed with a balance such that the amount of the DMC catalyst became 5 mg for 5 mL of a monomer. A copolymer B was obtained in the same manner as in Example 1 except that a pressure in the pressure vessel was set at 1.2 MPa and the reaction was caused at 80 degrees C. for 48 hours. A molar ratio ($[x/(x+y)]$) of a carbonate unit in the obtained copolymer B was 0.1.

The copolymer B was further subjected to TG-DTA measurement and DSC measurement to determine the 5%-weight-reduction temperature and glass transition temperature of the copolymer B. The 5%-weight-reduction temperature was 280 degrees C. and the glass transition temperature was −45 degrees C. The number average molecular weight of the copolymer B was 6500 and the Mw/Mn of the copolymer B was 1.9.

The obtained copolymer B was mixed with LiFSI having been weighed with a balance such that a salt concentration ($[z/(x+y)] \times 100$) in the solid electrolyte became as below, and well agitated to obtain a solid electrolyte. Subsequently, the solid electrolyte was casted on a fluorocarbon resin mold, and dried at 60 degrees C. for six hours in dry nitrogen atmosphere and further dried at 60 degrees C. for 24 hours under reduced pressure, thereby obtaining a solid electrolyte film having a salt concentration in the solid electrolyte as follows.

Example 2-1: 10 mol %
Example 2-2: 20 mol %
Example 2-3: 40 mol %
Example 2-4: 60 mol %
Example 2-5: 80 mol %

The ion conductivity ($\sigma$) of the obtained solid electrolyte film was measured.

Table 6 shows the results.

Example 3 (Example 3-1 to Example 3-8)

The DMC catalyst used in Example 2, or a catalyst of Example 3, was weighed with a balance such that the amount of the DMC catalyst became 5 mg for 5 mL of a monomer. A copolymer C was obtained in the same manner as in Example 1 except that a pressure in the pressure vessel was set at 3.7 MPa and the reaction was caused at 40 degrees C. for 16 hours. A molar ratio ($[x/(x+y)]$) of a carbonate unit in the obtained copolymer C was 0.8.

The copolymer C was further subjected to TG-DTA measurement and DSC measurement to determine the 5%-weight-reduction temperature and glass transition temperature of the copolymer C. The 5%-weight-reduction temperature was 232 degrees C. and the glass transition temperature was 2 degrees C. The number average molecular weight of the copolymer C was 98000 and the Mw/Mn of the copolymer C was 2.0.

The obtained copolymer C was mixed with LiFSI having been weighed with a balance such that a salt concentration ($[z/(x+y)] \times 100$) in the solid electrolyte became as below, and well agitated to obtain a solid electrolyte. Subsequently, the solid electrolyte was casted on a fluorocarbon resin mold, and dried at 60 degrees C. for six hours in dry nitrogen atmosphere and further dried at 60 degrees C. for 24 hours under reduced pressure, thereby obtaining a solid electrolyte film having a salt concentration in the solid electrolyte as follows.

Example 3-1: 10 mol %
Example 3-2: 20 mol %
Example 3-3: 40 mol %
Example 3-4: 60 mol %
Example 3-5: 80 mol %
Example 3-6: 100 mol %
Example 3-7: 120 mol %
Example 3-8: 160 mol %

The ion conductivity ($\sigma$) of the obtained solid electrolyte film was measured. Table 8 shows the results.

Comparative 1 (Comparative 1-1 to Comparative 1-8)

A commercially available polycarbonate (trade name: QPAC-25, manufactured by Empower Materials Inc.) was mixed with LiFSI having been weighed with a balance such that a salt concentration ($[z/(x+y)] \times 100$) in the solid electrolyte became as below, and well agitated to obtain a solid electrolyte. Subsequently, the solid electrolyte was casted on a fluorocarbon resin mold, and dried at 60 degrees C. for six hours in dry nitrogen atmosphere and further dried at 60 degrees C. for 24 hours under reduced pressure, thereby obtaining a solid electrolyte film having a salt concentration in the solid electrolyte as follows.

Comparative 1-1: 10 mol %
Comparative 1-2: 20 mol %
Comparative 1-3: 40 mol %
Comparative 1-4: 60 mol %
Comparative 1-5: 80 mol %
Comparative 1-6: 100 mol %
Comparative 1-7: 120 mol %
Comparative 1-8: 160 mol %

The ion conductivity ($\sigma$) of the obtained solid electrolyte film was measured. Table 9 shows the results.

Comparative 2 (Comparative 2-1 to Comparative 2-3)

A commercially available polyethylene oxide (manufactured by Sigma-Aldrich Co., LLC.) was mixed with LiFSI having been weighed with a balance such that a salt concentration ($[z/(x+y)] \times 100$) in the solid electrolyte became as below, and well agitated to obtain a solid electrolyte. Subsequently, the solid electrolyte was casted on a fluorocarbon resin mold, and dried at 60 degrees C. for six hours in dry nitrogen atmosphere and further dried at 60 degrees C. for 24 hours under reduced pressure, thereby obtaining a solid electrolyte film having a salt concentration in the solid electrolyte as follows. It should be noted that polyethylene oxide has no carbonate unit and thus a value of $[z/y] \times 100$ was calculated as a salt concentration in Comparative 2.

Further, in Comparative 2, an increase in the salt concentration leads to a reduction in the ion conductivity. Accordingly, it is clear that the ion conductivity of the solid electrolyte film would become insufficient if the salt concentration exceeds 35 mol %. Accordingly, no sample with a salt concentration in the solid electrolyte exceeding 35 mol % was manufactured.

Example 2-1: 5 mol %
Example 2-2: 10 mol %
Example 2-3: 35 mol %

The ion conductivity ($\sigma$) of the obtained solid electrolyte film was measured. Table 10 shows the results.

Evaluation of Solid Electrolyte Films

Figure 11:
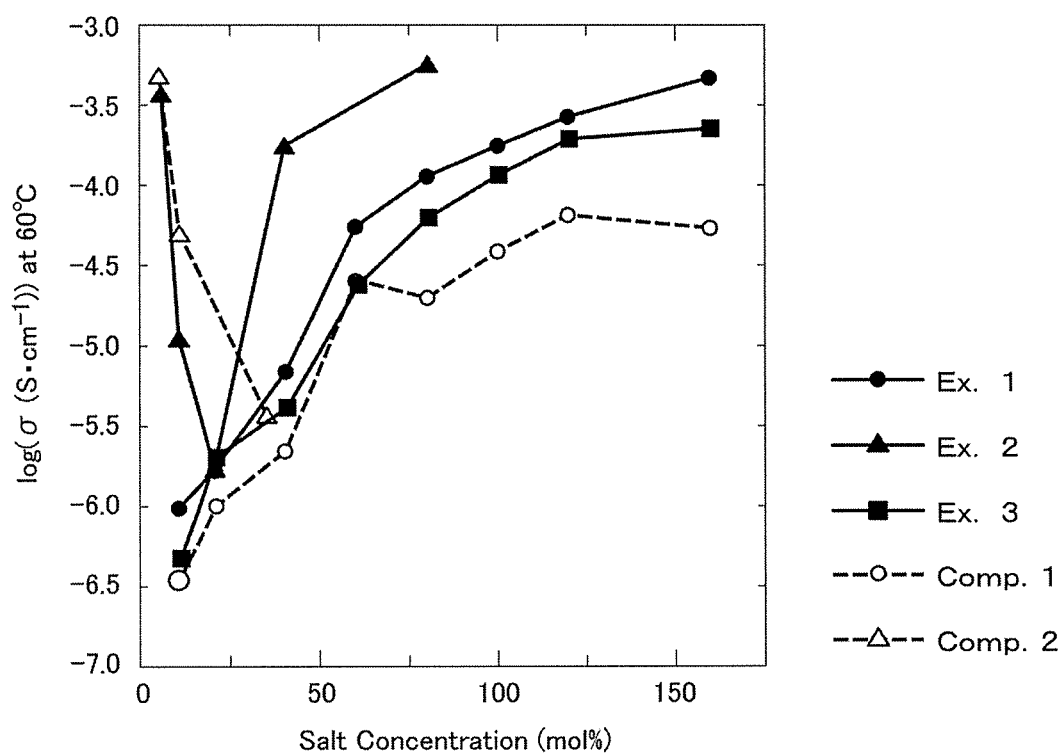
FIG. 11 is a graph showing a relationship between a salt concentration and a common logarithm of ion conductivity at 60 degrees C. in each of Examples 1 to 3 and Comparatives 1 and 2.

With regard to each of Example 1, Example 2, Example 3, Comparative 1 and Comparative 2, a relationship between the salt concentration ($[z/(x+y)] \times 100$) in the solid electrolyte and the common logarithm ($\log(\sigma)$) of the ion conductivity at 60 degrees C. is graphed (see FIG. 11).

As is understood from the results shown in FIG. 11, the solid electrolyte film of each of Example 1, Example 2, Example 3 and Comparative 1 tends to have a higher ion conductivity as the salt concentration in the solid electrolyte becomes higher. In contrast, the solid electrolyte film of Comparative 2 tends to have a lower ion conductivity as the salt concentration in the solid electrolyte becomes higher.

Accordingly, in the solid electrolyte film of the exemplary embodiment, a high salt concentration ($[z/(x+y)] \times 100$) in the solid electrolyte is preferable in terms of ion conductivity.

Further, with regard to each of Example 1, Example 2, Example 3, Comparative 1 and Comparative 2, the glass transition temperature (Tg) of the solid electrolyte film was determined. Further, the glass transition temperature (Tg) of each of the copolymer B obtained in Example 2 and the copolymer C obtained in Example 3 was determined. With regard to each of Example 1, Example 2, Example 3, Comparative 1 and Comparative 2, a relationship between the salt concentration ($[z/(x+y)] \times 100$) in the solid electrolyte and the glass transition temperature (Tg) is graphed (see FIG. 12).

Figure 12:
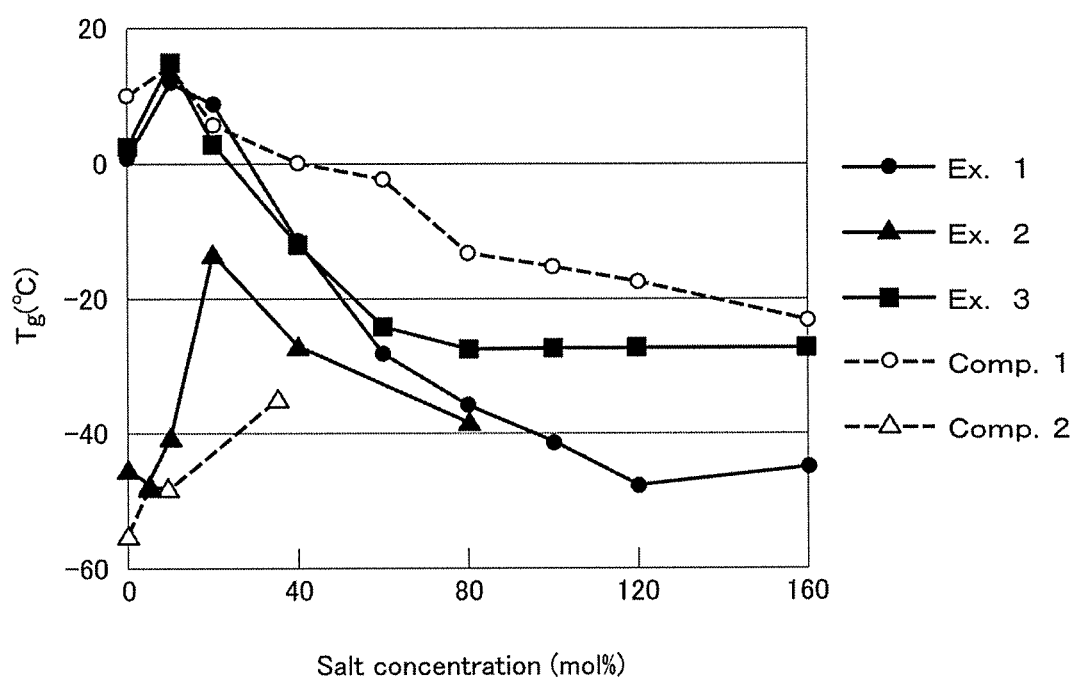
FIG. 12 is a graph showing a relationship between a salt concentration and a glass transition temperature in each of Examples 1 to 3 and Comparatives 1 and 2.

As is understood from the results shown in FIG. 12, the solid electrolyte film of each of Example 1 and Example 2 has a lower glass transition temperature than the solid electrolyte film of Comparative 1. On the other hand, the solid electrolyte film of each of Example 1 and Example 2 has a higher glass transition temperature than the solid electrolyte film of Comparative 2. However, among the solid electrolyte films of Example 1 and Example 2, those of Example 1-5, Example 1-6, Example 1-7, Example 1-8 and Example 2-5, which have relatively high salt concentrations, have glass transition temperatures comparable to that of the solid electrolyte film of Comparative 2.

With regard to each of Example 1-8, Example 2-5, Example 3-8, Comparative 1-8 and Comparative 2-1, Table 2 below shows the molar ratio ($[x/(x+y)]$) of the carbonate unit in the polymer, the salt concentration ($[z/(x+y)] \times 100$) in the solid electrolyte, the lithium ion transport number ($t_+$), the ion conductivity ($\sigma$) at 60 degrees C., and the lithium ion conductivity ($t_+ \times \sigma$).

It should be noted that Example 1-8, Example 2-5, Example 3-8 and Comparative 1-8, each of which has a relatively high salt concentration in the solid electrolyte, are selected from Example 1, Example 2, Example 3 and Comparative 1 in view of the above evaluation results. Comparative 2-1, which has a relatively low salt concentration in the solid electrolyte, is selected from Comparative 2 in view of the above evaluation results.

TABLE 2

| | Molar Ratio of Carbonate Unit in Polymer [x/(x + y)] | Salt Concentration [z/(x + y)] × 100 (mol %) | Lithium Ion Transport Number $t_+$ | Ion Conductivity $\sigma$ (S · cm$^{-1}$) | Lithium Ion Conductivity $t_+ \times \sigma$ (S · cm$^{-1}$) |
|---|---|---|---|---|---|
| Ex. 1-8 | 0.7 | 160 | 0.66 | $4.84 \times 10^{-4}$ | $3.2 \times 10^{-4}$ |
| Ex. 2-5 | 0.1 | 80 | 0.63 | $6.10 \times 10^{-4}$ | $3.8 \times 10^{-4}$ |
| Ex. 3-8 | 0.8 | 160 | 0.65 | $2.32 \times 10^{-4}$ | $1.5 \times 10^{-4}$ |
| Comp. 1-8 | 1.0 | 160 | 0.67 | $5.48 \times 10^{-5}$ | $3.7 \times 10^{-5}$ |
| Comp. 2-1 | 0.0 | 5 | 0.11 | $5.12 \times 10^{-4}$ | $5.6 \times 10^{-5}$ |

As is understood from the results in Table 2, it has been found that the solid electrolyte film of each of Example 1-8, Example 2-5 and Example 3-8 has a high lithium ion transport number ($t_+$) and a high ion conductivity ($\sigma$).

Further, in comparing Example 1-8, Example 2-5 and Example 3-8 with Comparative 1-8 and Comparative 2-1, it has been found that the lithium ion conductivity ($t_+ \times \sigma$), i.e., a product of the lithium ion transport number ($t_+$) and the ion conductivity ($\sigma$), is significantly improved in Example. Therefore, the solid electrolyte film of Example is favorably usable as a material for an electrolyte layer in a lithium ion secondary battery.

Figure 13:
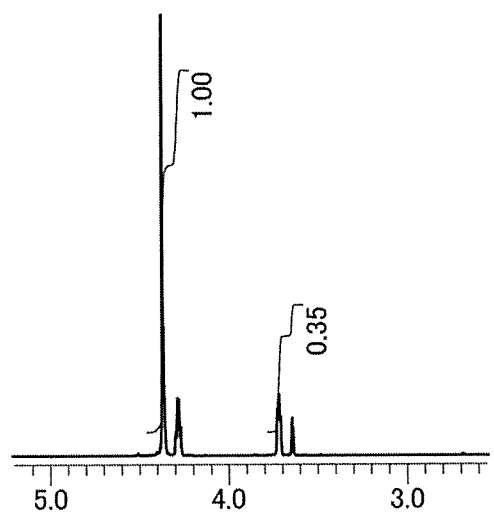
FIG. 13 shows a $^1$H-NMR spectrum of a copolymer D synthesized in Example 4.
Figure 14:
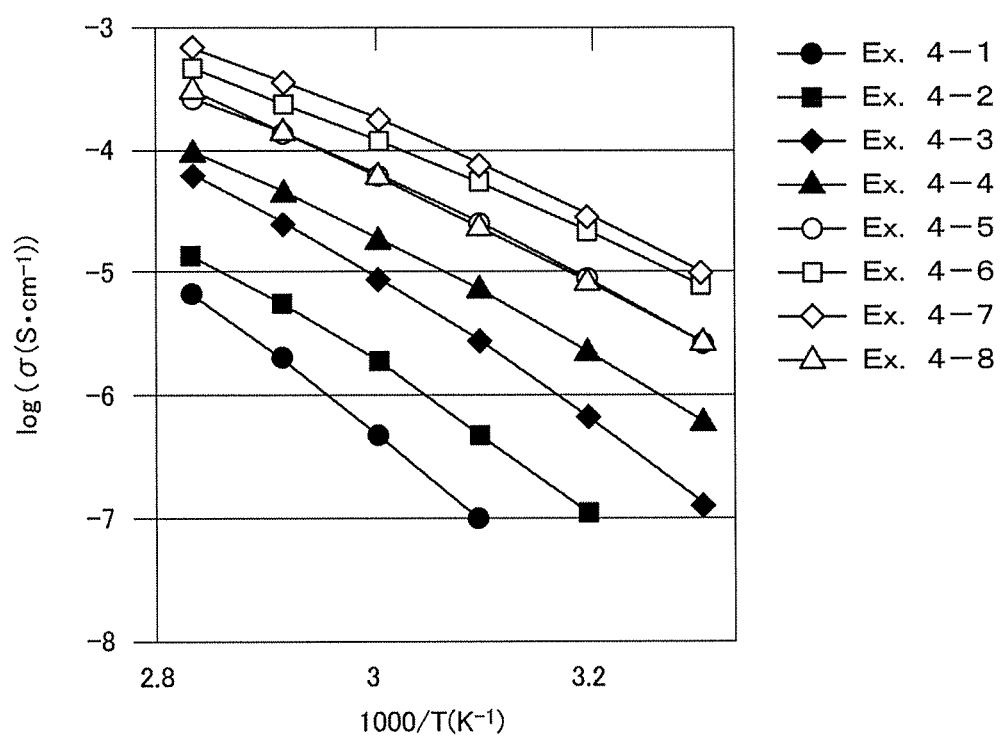
FIG. 14 shows an Arrhenius plot showing a relationship between a reciprocal number of temperature and a common logarithm of ion conductivity in each of Example 4-1 to Example 4-8.

Example 4 (Example 4-1 to Example 4-8) The DMC catalyst used in Example 2, or a catalyst of Example 4, was weighed with a balance such that the amount of the DMC catalyst became 5 mg for 5 mL of a monomer. A copolymer D was obtained in the same manner as in Example 1 except that a pressure in the pressure vessel was set at 2.0 MPa and the reaction was caused at 40 degrees C. for 20 hours. A structure of the obtained copolymer D was determined using $^1$H-NMR (see FIG. 13). A molar ratio ([x/(x+y)]) of a carbonate unit in the obtained copolymer D was 0.7.

The copolymer D was further subjected to TG-DTA measurement and DSC measurement to determine the 5%-weight-reduction temperature and glass transition temperature of the copolymer D. The 5%-weight-reduction temperature was 230 degrees C. and the glass transition temperature was −1.1 degrees C. The number average molecular weight of the copolymer D was 44000 and the Mw/Mn of the copolymer D was 2.2.

The obtained copolymer D was mixed with LiFSI having been weighed with a balance such that a salt concentration ([z/(x+y)]×100) in the solid electrolyte became as below, and well agitated to obtain a solid electrolyte. Subsequently, the solid electrolyte was casted on a fluorocarbon resin mold, and dried at 60 degrees C. for six hours in dry nitrogen atmosphere and further dried at 60 degrees C. for 24 hours under reduced pressure, thereby obtaining a solid electrolyte film having a salt concentration in the solid electrolyte as follows.
Example 4-1: 10 mol %
Example 4-2: 20 mol %
Example 4-3: 40 mol %
Example 4-4: 60 mol %
Example 4-5: 80 mol %
Example 4-6: 100 mol %
Example 4-7: 120 mol %
Example 4-8: 160 mol %

The ion conductivity ($\sigma$) of the obtained solid electrolyte film was measured. Table 14 shows the results.

Example 5 (Example 5-1 to Example 5-8)

Figure 15:
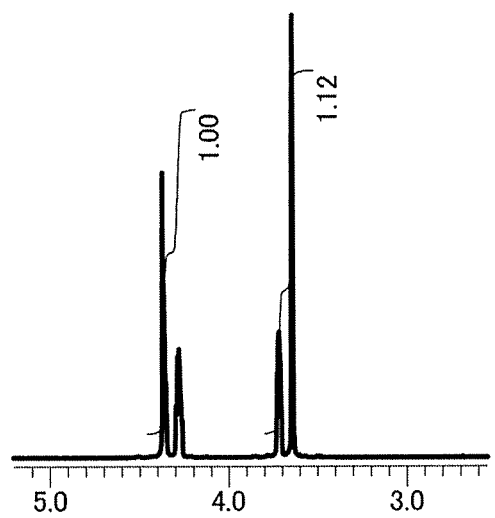
FIG. 15 shows a $^1$H-NMR spectrum of a copolymer E synthesized in Example 5.
Figure 16:
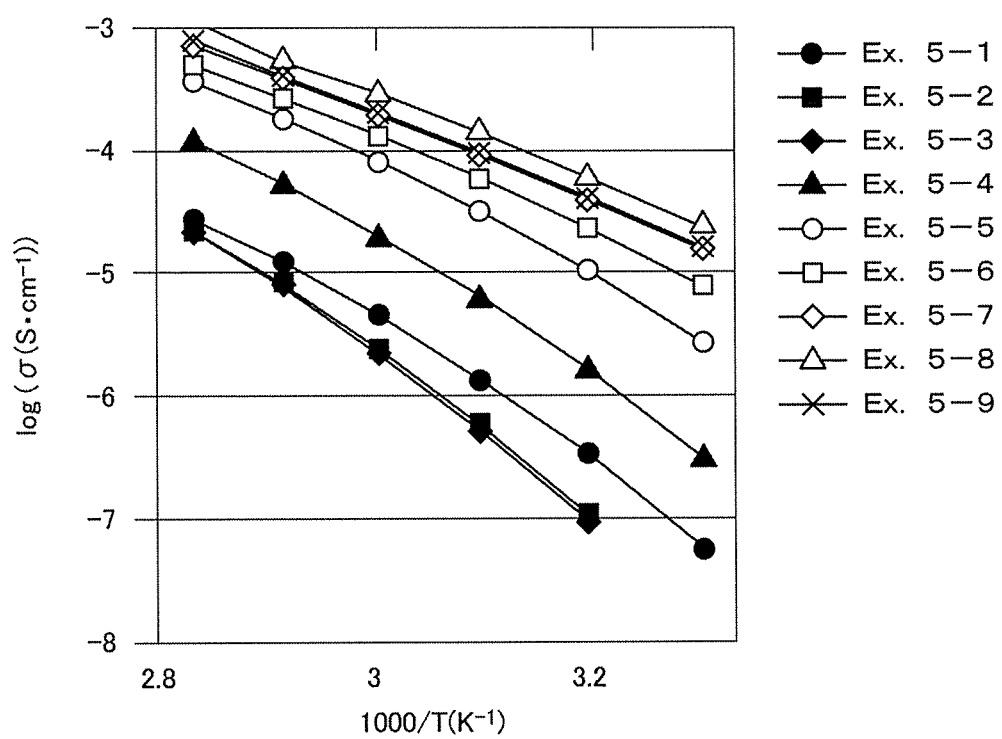
FIG. 16 shows an Arrhenius plot showing a relationship between a reciprocal number of temperature and a common logarithm of ion conductivity in each of Example 5-1 to Example 5-9.

The DMC catalyst used in Example 2, or a catalyst of Example 5, was weighed with a balance such that the amount of the DMC catalyst became 5 mg for 5 mL of a monomer. A copolymer E was obtained in the same manner as in Example 1 except that a pressure in the pressure vessel was set at 4.0 MPa and the reaction was caused at 60 degrees C. for 20 hours. A structure of the obtained copolymer E was determined using $^1$H-NMR (see FIG. 15). A molar ratio ([x/(x+y)]) of a carbonate unit in the obtained copolymer E was 0.5.

The copolymer E was further subjected to TG-DTA measurement and DSC measurement to determine the 5%-weight-reduction temperature and glass transition temperature of the copolymer E. The 5%-weight-reduction temperature was 242 degrees C. and the glass transition temperature was −23.4 degrees C. The number average molecular weight of the copolymer E was 80000 and the Mw/Mn of the copolymer E was 2.2.

The obtained copolymer E was mixed with LiFSI having been weighed with a balance such that a salt concentration ([z/(x+y)]×100) in the solid electrolyte became as below, and well agitated to obtain a solid electrolyte. Subsequently, the solid electrolyte was casted on a fluorocarbon resin mold, and dried at 60 degrees C. for six hours in dry nitrogen atmosphere and further dried at 60 degrees C. for 24 hours under reduced pressure, thereby obtaining a solid electrolyte film having a salt concentration in the solid electrolyte as follows.
Example 5-1: 5 mol %
Example 5-2: 10 mol %
Example 5-3: 20 mol %
Example 5-4: 40 mol %
Example 5-5: 60 mol %
Example 5-6: 80 mol %
Example 5-7: 100 mol %
Example 5-8: 120 mol %
Example 5-9: 160 mol %

The ion conductivity ($\sigma$) of the obtained solid electrolyte film was measured. Table 16 shows the results.

Example 6 (Example 6-1 to Example 6-8)

Figure 17:
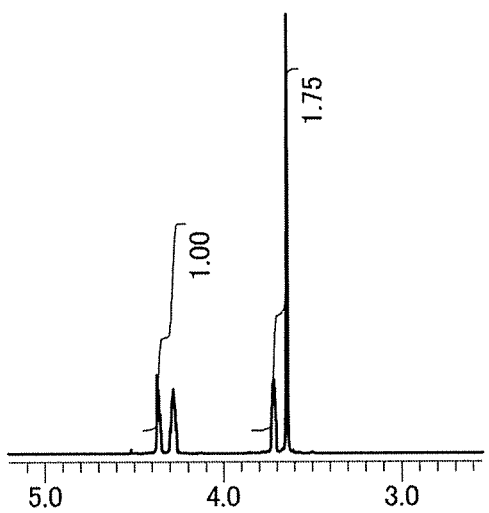
FIG. 17 shows a $^1$H-NMR spectrum of a copolymer F synthesized in Example 6.
Figure 18:
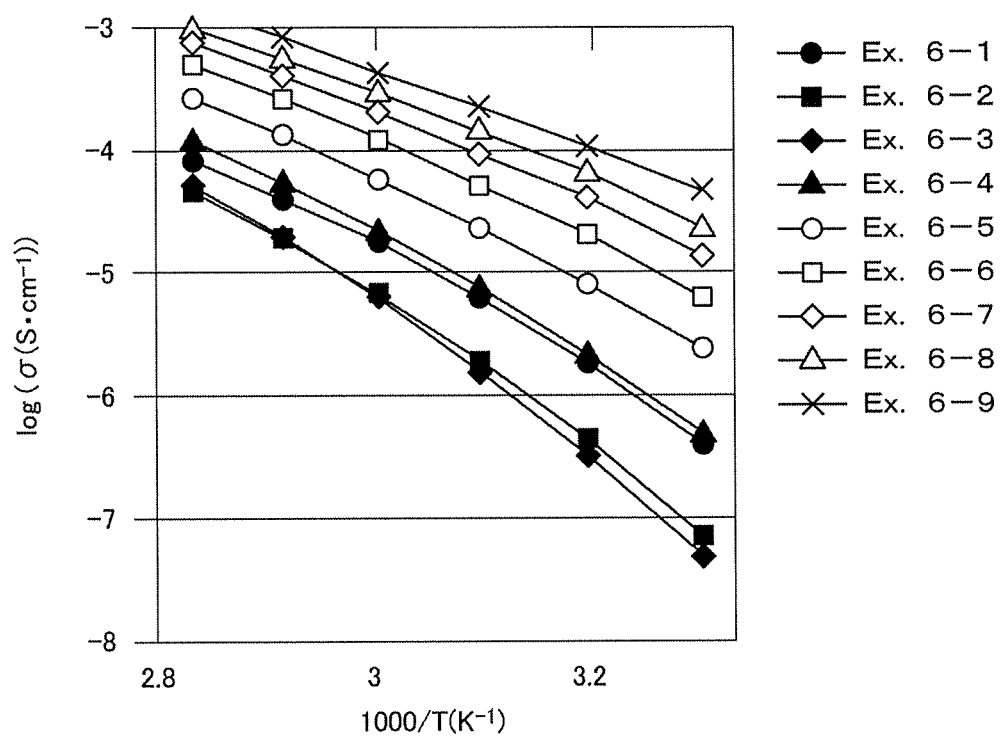
FIG. 18 shows an Arrhenius plot showing a relationship between a reciprocal number of temperature and a common logarithm of ion conductivity in each of Example 6-1 to Example 6-9.

The DMC catalyst used in Example 2, or a catalyst of Example 6, was weighed with a balance such that the amount of the DMC catalyst became 5 mg for 5 mL of a monomer. A copolymer F was obtained in the same manner as in Example 1 except that a pressure in the pressure vessel was set at 2.0 MPa and the reaction was caused at 70 degrees C. for 20 hours. A structure of the obtained copolymer F was determined using $^1$H-NMR (see FIG. 17). A molar ratio ([x/(x+y)]) of a carbonate unit in the obtained copolymer F was 0.4.

The copolymer F was further subjected to TG-DTA measurement and DSC measurement to determine the 5%-weight-reduction temperature and glass transition temperature of the copolymer F. The 5%-weight-reduction temperature was 251 degrees C. and the glass transition temperature was −31.4 degrees C. The number average molecular weight of the copolymer F was 126000 and the Mw/Mn of the copolymer F was 2.3.

The obtained copolymer E was mixed with LiFSI having been weighed with a balance such that a salt concentration ([z/(x+y)]×100) in the solid electrolyte became as below, and well agitated to obtain a solid electrolyte. Subsequently, With regard to Example 4-7, Example 5-8 and Example 6-9, Table 3 below shows the molar ratio ([x/(x+y)]) of the carbonate unit in the polymer, the salt concentration ([z/(x+y)]×100) in the solid electrolyte, the lithium ion transport number ($t_+$), the ion conductivity ($\sigma$) at 60 degrees C., and the lithium ion conductivity ($t_+ \times \sigma$).

It should be noted that Example 4-7, Example 5-8 and Example 6-9 are selected from Example 4, Example 5 and Example 6 in view of the above evaluation results.

TABLE 3

| | Molar Ratio of Carbonate Unit in Polymer [x/(x + y)] | Salt Concentration [z/(x + y)] × 100 (mol %) | Lithium Ion Transport Number $t_+$ | Ion Conductivity $\sigma$ (S · cm$^{-1}$) | Lithium Ion Conductivity $t_+ \times \sigma$ (S · cm$^{-1}$) |
|---|---|---|---|---|---|
| Ex. 4-7 | 0.7 | 120 | 0.63 | 1.81 × 10$^{-4}$ | 1.14 × 10$^{-4}$ |
| Ex. 5-8 | 0.5 | 120 | 0.64 | 2.95 × 10$^{-4}$ | 1.89 × 10$^{-4}$ |
| Ex. 6-9 | 0.4 | 160 | 0.65 | 4.37 × 10$^{-4}$ | 2.84 × 10$^{-4}$ | the solid electrolyte was casted on a fluorocarbon resin mold, and dried at 60 degrees C. for six hours in dry nitrogen atmosphere and further dried at 60 degrees C. for 24 hours under reduced pressure, thereby obtaining a solid electrolyte film having a salt concentration in the solid electrolyte as follows.
Example 6-1: 5 mol %
Example 6-2: 10 mol %
Example 6-3: 20 mol %
Example 6-4: 40 mol %
Example 6-5: 60 mol %
Example 6-6: 80 mol %
Example 6-7: 100 mol %
Example 6-8: 120 mol %
Example 6-9: 160 mol %

The ion conductivity ($\sigma$) of the obtained solid electrolyte film was measured. Table 18 shows the results.

Evaluation of Solid Electrolyte Films

Figure 19:
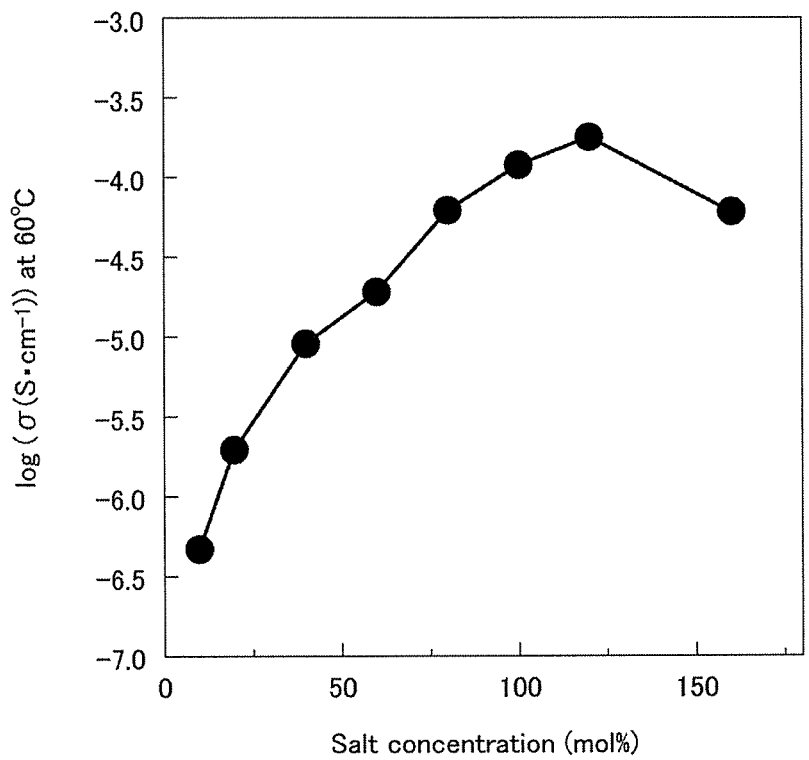
FIG. 19 is a graph showing a relationship between a salt concentration and a common logarithm of ion conductivity at 60 degrees C. in Example 4.
Figure 20:
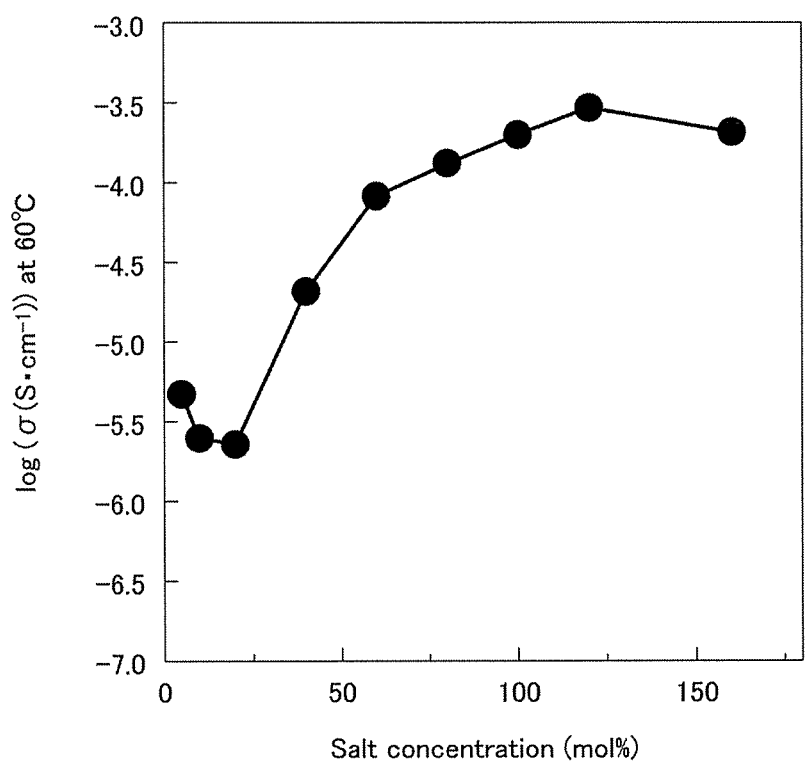
FIG. 20 is a graph showing a relationship between a salt concentration and a common logarithm of ion conductivity at 60 degrees C. in Example 5.
Figure 21:
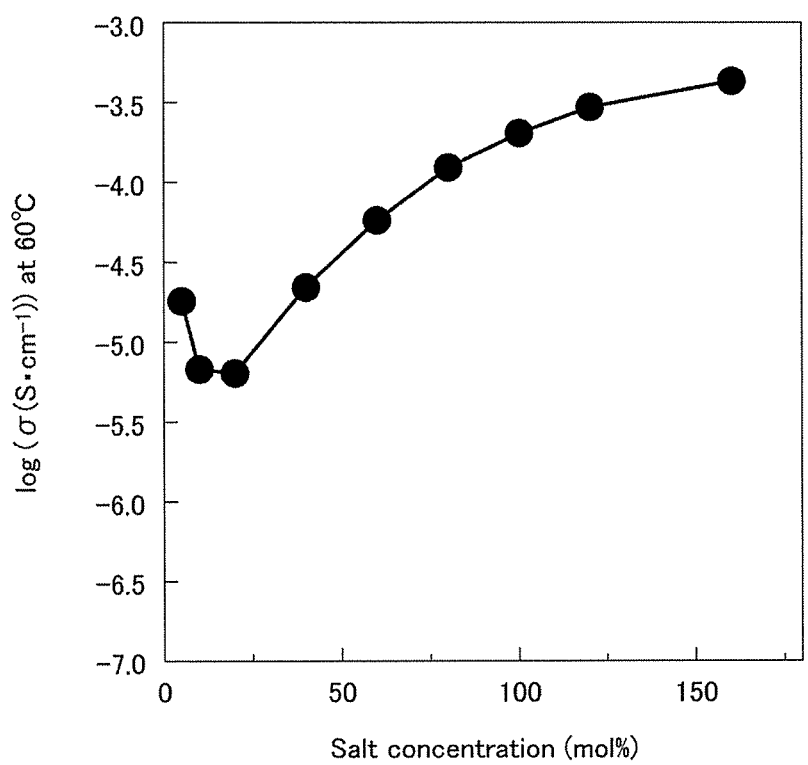
FIG. 21 is a graph showing a relationship between a salt concentration and a common logarithm of ion conductivity at 60 degrees C. in Example 6.

With regard to each of Example 4, Example 5 and Example 6, a relationship between the salt concentration ([z/(x+y)]×100) in the solid electrolyte and the common logarithm (log($\sigma$)) of the ion conductivity at 60 degrees C. is individually graphed (see FIGS. 19, 20 and 21).

As is understood from the results shown in FIGS. 19 and 20, it has been found that the solid electrolyte film of each of Example 4 and Example 5 has the maximum ion conductivity at 120 mol % of the salt concentration in the solid electrolyte (Example 4-7 and Example 5-7). It has also been found that the solid electrolyte film of Example 6 has the maximum ion conductivity at 160 mol % of the salt concentration in the solid electrolyte (Example 6-8).

Further, with regard to each of Example 4, Example 5 and Example 6, the glass transition temperature (Tg) of the solid electrolyte film was determined. With regard to each of Example 4, Example 5 and Example 6, a relationship between the salt concentration ([z/(x+y)]×100) in the solid electrolyte and the glass transition temperature (Tg) is individually graphed (see FIGS. 22, 23 and 24).

Figure 22:
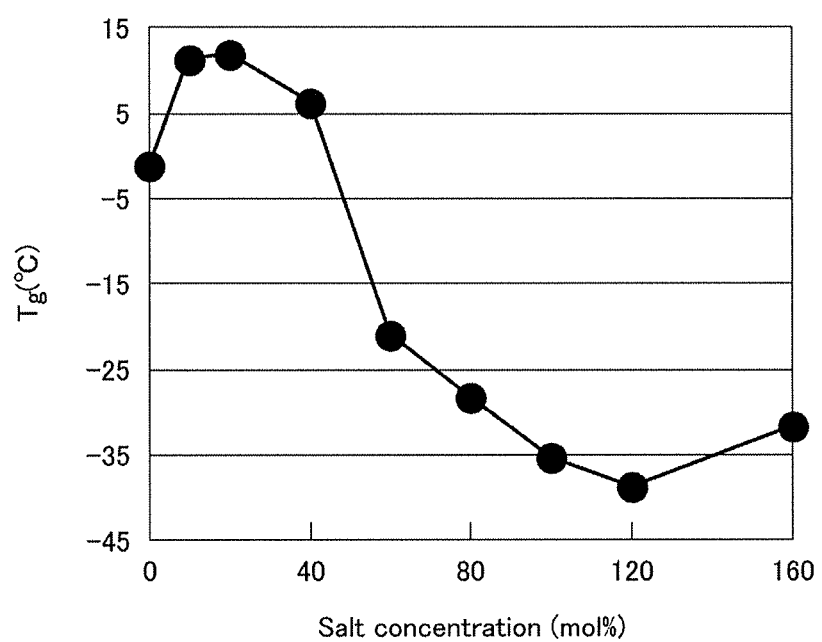
FIG. 22 is a graph showing a relationship between a salt concentration and a glass transition temperature in Example 4.
Figure 23:
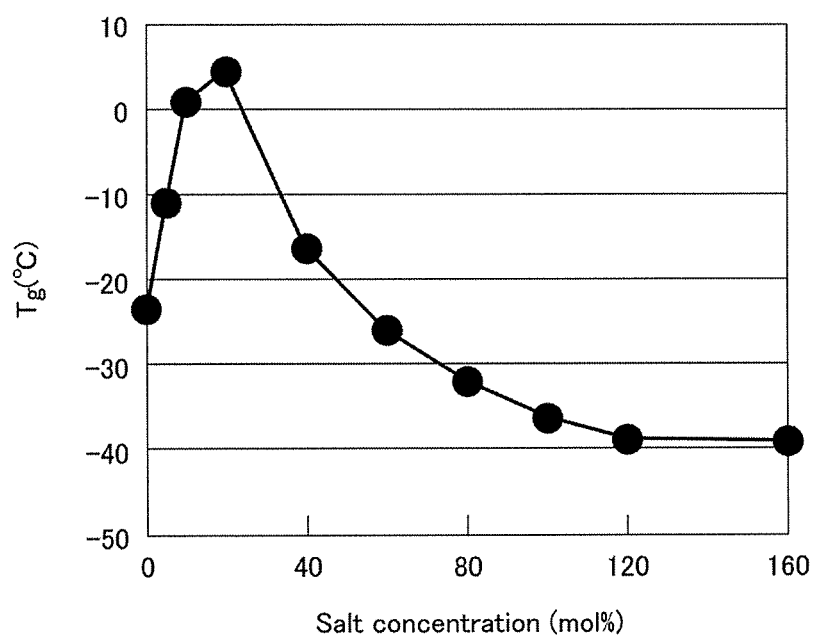
FIG. 23 is a graph showing a relationship between a salt concentration and a glass transition temperature in Example 5.
Figure 24:
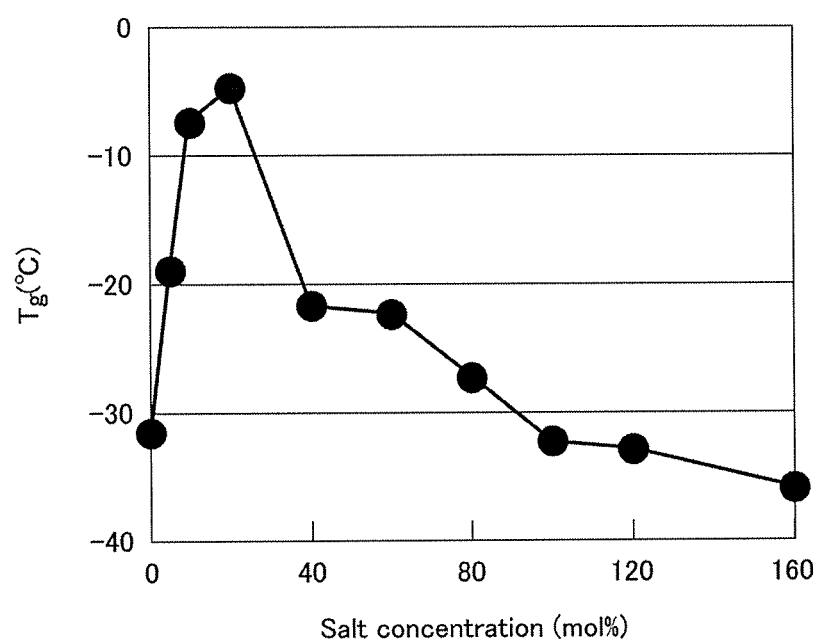
FIG. 24 is a graph showing a relationship between a salt concentration and a glass transition temperature in Example 6.

As is understood from the results shown in FIGS. 22, 23 and 24, the solid electrolyte film of each of Example 4, Example 5 and Example 6 has the maximum glass transition temperature at approximately 20 mol % of the salt concentration in the solid electrolyte, and tends to have, at 20 mol % or higher of the salt concentration in the solid electrolyte, a glass transition temperature that decreases with an increase in the salt concentration in the solid electrolyte.

As is understood from the results in Table 3, it has been found that the solid electrolyte film of each of Example 4-7, Example 5-8 and Example 6-9 has a high lithium ion transport number ($t_+$) and a high ion conductivity ($\sigma$).

It has also been found that the value of [x/(x+y)] is preferably 0.6 or less, more preferably 0.5 or less, in terms of lithium ion conductivity ($t_+ \times \sigma$).

The invention claimed is:

1. A solid electrolyte comprising:
   a copolymer consisting of a constituent unit represented by a formula (1) below and a constituent unit represented by a formula (2) below; and
   a metal salt,

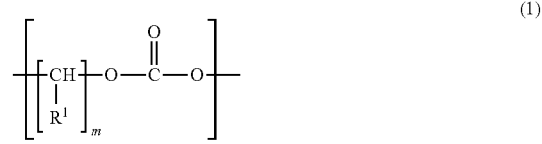

(1)

where m is 2, and $R^1$ represents a hydrogen atom,

(2)

where n is 2, and $R^2$ represents a hydrogen atom, and
wherein a number average molecular weight [Mn] of the copolymer ranges between 6,500 and 500,000.

2. The solid electrolyte according to claim 1, wherein when a mole number of the constituent unit represented by the formula (1) in the copolymer is x (mol) and a mole number of the constituent unit represented by the formula (2) in the copolymer is y (mol), a condition represented by an equation (F1) below is satisfied, $$0.01 \leq [x/(x+y)] \leq 0.99 \quad (F1).$$

3. The solid electrolyte according to claim 1, wherein the metal salt is a lithium salt.

4. The solid electrolyte according to claim 3, wherein the lithium salt comprises at least one of lithium-bis(trifluoromethanesulfonyl)imide or lithium-bis(fluorosulfonyl)imide.

5. The solid electrolyte according to claim 1, wherein when a mole number of the constituent unit represented by the formula (1) in the copolymer is x (mol), a mole number of the constituent unit represented by the formula (2) in the copolymer is y (mol), and a mole number of a metal in the metal salt is z (mol), a condition represented by an expression (F2) below is satisfied, $$0.01 \leq [z/(x+y)] \leq 2 \tag{F2}.$$

6. A battery comprising the solid electrolyte according to claim 1.

7. The solid electrolyte according to claim 1, wherein the metal salt is an alkali metal salt.

* * * * *